(12) United States Patent
Fujiwara

(10) Patent No.: US 11,126,770 B2
(45) Date of Patent: Sep. 21, 2021

(54) METHOD OF SEMICONDUCTOR INTEGRATED CIRCUIT, CIRCUIT DESIGN SYSTEM, AND NON-TRANSITORY COMPUTER-READABLE MEDIUM

(71) Applicant: Kioxia Corporation, Minato-ku (JP)

(72) Inventor: Shintaro Fujiwara, Hiratsuka (JP)

(73) Assignee: Kioxia Corporation, Minato-ku (JP)

( * ) Notice: Subject to any disclaimer, the term of this patent is extended or adjusted under 35 U.S.C. 154(b) by 0 days.

(21) Appl. No.: 16/777,987

(22) Filed: Jan. 31, 2020

(65) Prior Publication Data

US 2021/0019462 A1    Jan. 21, 2021

(30) Foreign Application Priority Data

Jul. 16, 2019   (JP) .............................. JP2019-130913

(51) Int. Cl.
```
G06F 30/30      (2020.01)
G06F 30/3312    (2020.01)
G06F 30/327     (2020.01)
G06F 30/392     (2020.01)
G06F 30/396     (2020.01)
G06F 30/3953    (2020.01)
G06F 119/12     (2020.01)
```
(52) U.S. Cl.
CPC ........ *G06F 30/3312* (2020.01); *G06F 30/327* (2020.01); *G06F 30/392* (2020.01); *G06F 30/396* (2020.01); *G06F 30/3953* (2020.01); *G06F 2119/12* (2020.01)

(58) Field of Classification Search
CPC .. G06F 30/327; G06F 30/3312; G06F 30/392; G06F 30/3953; G06F 30/396; G06F 2119/12
See application file for complete search history.

(56) References Cited

U.S. PATENT DOCUMENTS

| | | | |
|---|---|---|---|
| 8,726,217 B2 | 5/2014 | Gullette | |
| 9,064,081 B1 * | 6/2015 | Hsu | ........................ G06F 30/398 |
| 10,452,807 B1 * | 10/2019 | Sharma | .................... G06F 30/18 |
| 2011/0066987 A1 * | 3/2011 | Handa | .................... G06F 30/327 |
| | | | 716/104 |

FOREIGN PATENT DOCUMENTS

| | | |
|---|---|---|
| JP | 2003-99493 A | 4/2003 |
| JP | 5402430 B2 | 1/2014 |

OTHER PUBLICATIONS

T. Taghavi et al., "New Placement Prediction and Mitigation Techniques for Local Routing Congestion," 2010 IEEE, pp. 621-624. (Year: 2010).*

(Continued)

*Primary Examiner* — Leigh M Garbowski
(74) *Attorney, Agent, or Firm* — Oblon, McClelland, Maier & Neustadt, L.L.P.

(57) ABSTRACT

A design method of a semiconductor integrated circuit according to embodiments includes: creating pseudo-cell information for cells included in cell library information, the pseudo-cell information reflecting the degree of difficulty of pin access that connects wires to pins set in the cells; and using cells with a low difficulty of pin access with reference to the pseudo-cell information in timing optimization.

18 Claims, 17 Drawing Sheets

(56) References Cited

OTHER PUBLICATIONS

S.-R. Fang et al., "On Benchmarking Pin Access for Nanotechnology Standard Cells," 2017 IEEE Computer Society Annual Symposium on VLSI, pp. 237-242. (Year: 2017).*
J. Seo et al., "Pin Accessibility-Driven Cell Layout Redesign and Placement Optimization," 2017 ACM DAC, 6 pages. (Year: 2017).*
H.-Y. Su et al., "Pin Accessibility Evaluating Model for Improving Routability of VLSI Designs," 2017 IEEE, pp. 56-61. (Year: 2017).*

\* cited by examiner

| NUMBER OF PIN ACCESSIBLE POSITIONS | PIN COST |
|---|---|
| 4 OR MORE | 1 |
| 3 | 2 |
| 2 | 3 |
| 1 | 4 |
| 0 | 10 |

FIG. 13

| CELL | CELL DELAY (ns) | CELL AREA ($\mu m \times \mu m$) |
|---|---|---|
| A | 0.2 | 2.5 |
| B | 0.2 | 2.0 |
| C | 0.1 | 2.5 |
| D | 0.1 | 2.0 |

FIG. 14

| CELL | CELL COST | CELL DELAY (ns) | PSEUDO-CELL AREA ($\mu m \times \mu m$) |
|---|---|---|---|
| A | 2 | 0.2 | 5.0 |
| B | 3 | 0.2 | 6.0 |
| C | 1 | 0.1 | 2.5 |
| D | 4 | 0.1 | 8.0 | ns of
METHOD OF SEMICONDUCTOR INTEGRATED CIRCUIT, CIRCUIT DESIGN SYSTEM, AND NON-TRANSITORY COMPUTER-READABLE MEDIUM

CROSS REFERENCE TO RELATED APPLICATIONS

This application is based upon and claims the benefit of priority from prior Japanese Patent Application P2019-130913 filed on Jul. 16, 2019; the entire contents of which are incorporated by reference herein.

FIELD

Embodiments described herein relate generally to a design method of a semiconductor integrated circuit, a circuit design system, and a non-transitory computer readable medium.

BACKGROUND

In production of semiconductor masks to be used in manufacturing processes of semiconductor integrated circuits, such as Systems-on-chip (SoC), implementation design is performed to arrange standard cells (hereinafter, just referred to as cells) and circuit wiring based on circuit descriptions. Implementation design includes timing optimization after each of the processes including cell placement, clock tree synthesis, and detailed routing. In timing optimization, cells are replaced, added, and deleted to meet timing constraints.

Timing optimization considers cell area and the like but does not sufficiently consider routing. For example, the degree of routing congestion, such as how many wires are placed in each routing area is considered by global routing but not by detailed routing. Problems of pin access are discovered when the results of detailed routing are checked. Herein, a "pin access" refers to a layout of a wire that connects to a connection region (pin) provided for a cell. If there is a pin access problem involving a pin of a cell that cannot connect to a wire in detailed routing, the design process needs to restart from cell placement. The design process therefore returns to cell placement in implementation design. This causes the product development to run behind schedule, increasing the design costs.

BRIEF DESCRIPTION OF THE DRAWINGS

FIG. 13 is a table illustrating a cell information example.

FIG. 14 is a table illustrating a pseudo-cell information example.

DETAILED DESCRIPTION

Design methods of a semiconductor integrated circuit according to embodiments create pseudo-cell information that reflects a degree of difficulty of pin access and with reference to the pseudo-cell information, use cells with low difficulty of pin access in timing optimization.

Hereinafter, the embodiments are described with reference to the drawings. In the description of the drawings, the same portions are given the same reference symbols, and the description thereof is omitted.

First Embodiments

The design method of a semiconductor integrated circuit according to a first embodiment is applied to implementation design of a semiconductor integrated circuit using standard cells. The design method of a semiconductor integrated circuit according to the first embodiment includes a pseudo-cell information creation process S100 and a circuit design process S200 as illustrated in FIG. 1.

In the pseudo-cell information creation process S100, pseudo-cell information reflecting the degree of difficulty of pin access. The degree of difficulty of pin access refers to the difficulty that connect a wire to pins set in cells is created. The pseudo-cell information is created for cells included in cell library information of standard cells. The pseudo-cell information is created for each cell included in cell library information, for example. In the circuit design process S200, implementation design is performed, including timing optimization. In timing optimization, cells with relatively low difficulty of pin access are employed with reference to the pseudo-cell information.

Figure 1:
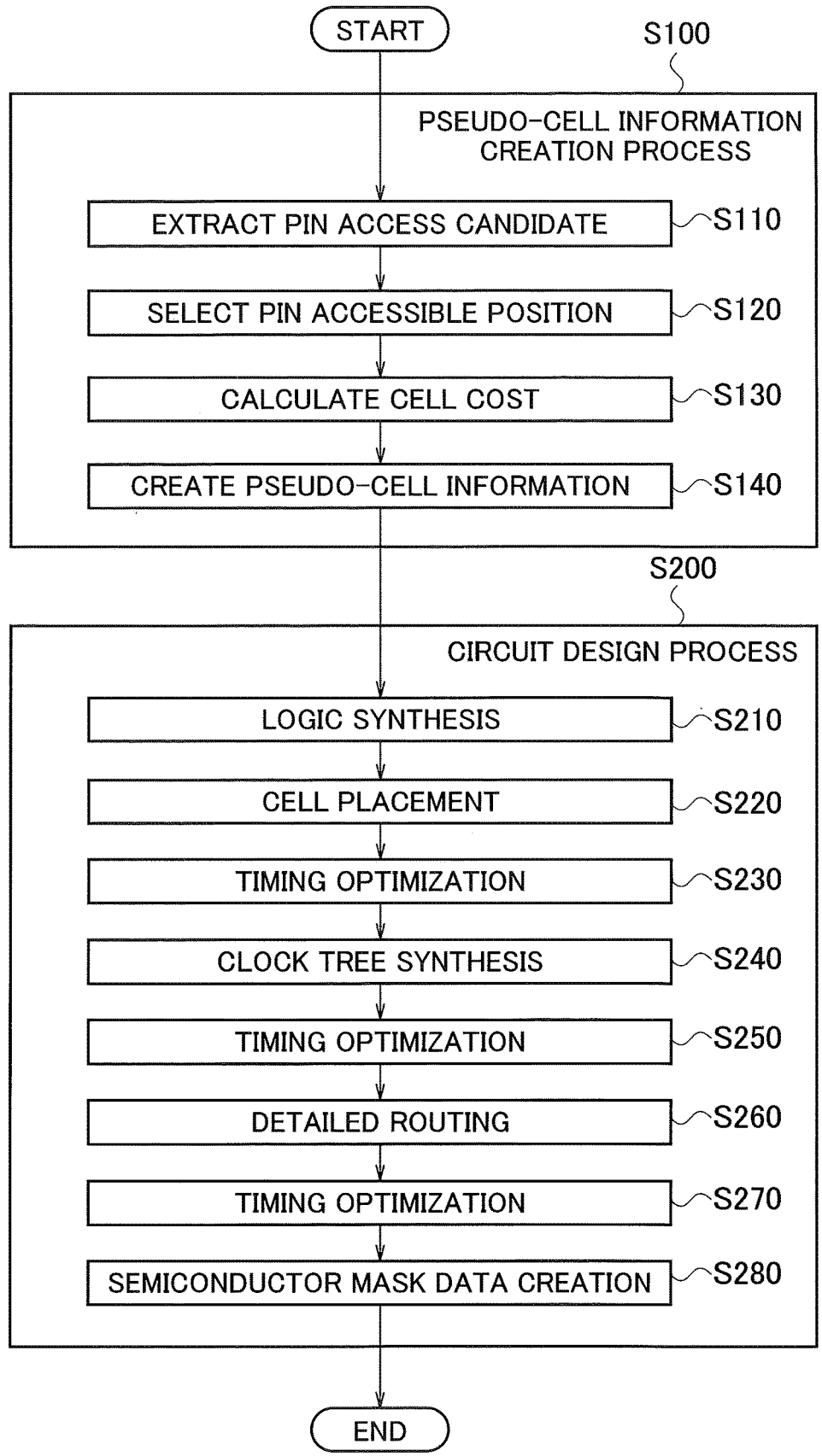
FIG. 1 is a flowchart for explaining a design method of a semiconductor integrated circuit according to a first embodiment.
Figure 2:
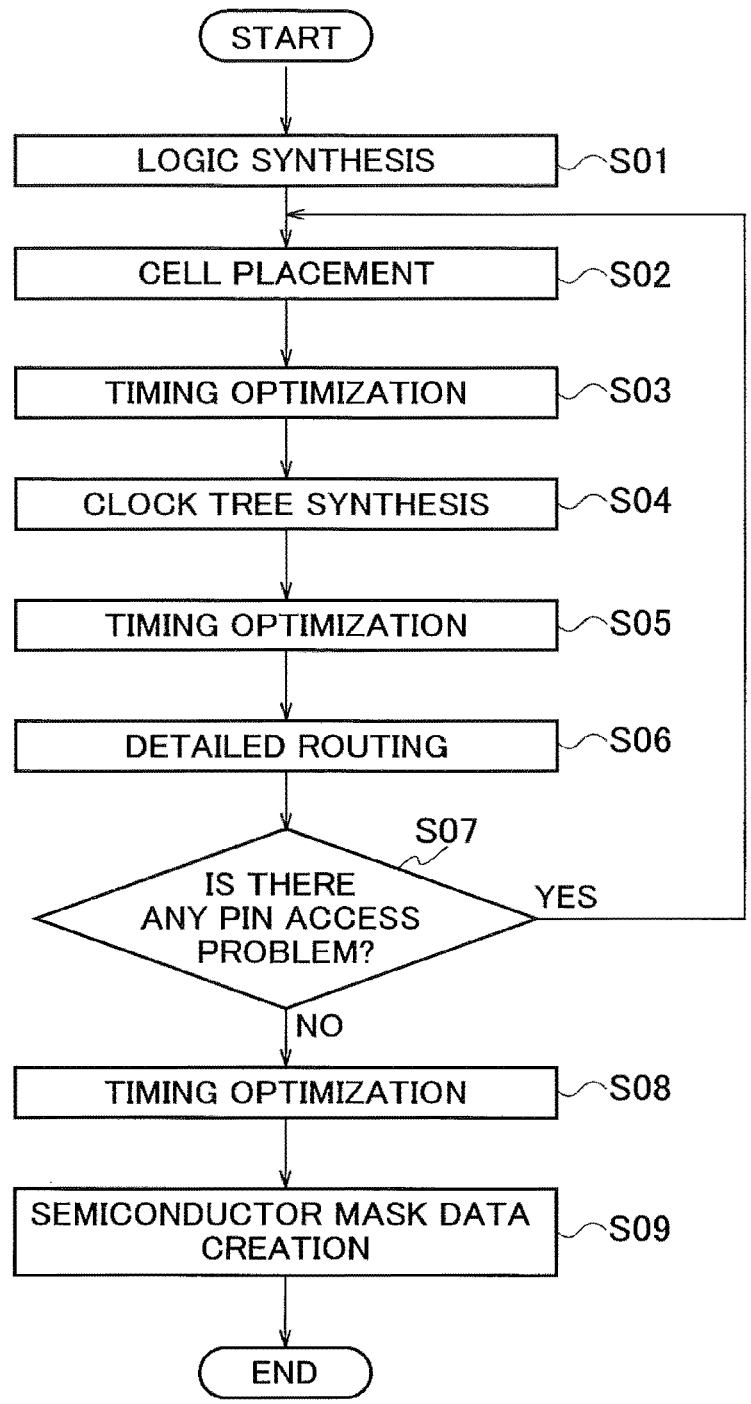
FIG. 2 is a flowchart for explaining a design method of Comparative Example.

Before detailed description of the design method illustrated in FIG. 1, the design method of a semiconductor integrated circuit of Comparative Example is described. In the design method of Comparative Example, the process proceeds from logic synthesis (step S01) based on circuit description to cell placement (step S02), clock tree synthesis (step 04), and detailed routing (step S06) in this order as illustrated in FIG. 2. After each of the steps of cell placement, clock tree synthesis, and detailed routing, timing optimization is performed (steps S03, S05, and S08). In timing optimization, library information containing cell information, including cell delay and area, is referred to. Herein, the cell delay is a delay caused in signals passing through the cell. At the end, semiconductor mask data creation (step S09) is performed.

In the design method of Comparative Example, as illustrated in FIG. 2, it is determined whether a pin access problem occurs after detailed routing (step S07). The pin access problem herein refers to any problem involving a pin of a cell which is unable to connect to a wire (step S07). When a pin access problem occurs, the design process returns to cell placement. Such pin access problems are described below.

Figure 3:
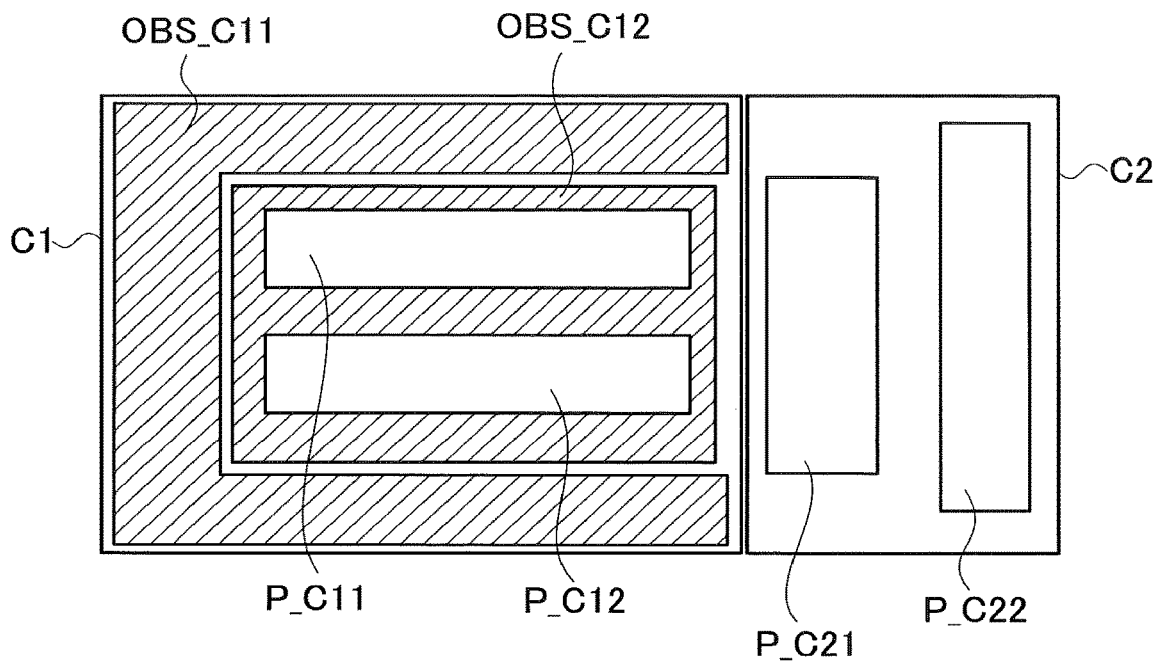
FIG. 3 is a schematic diagram illustrating a cell used to explain the design method of Comparative Example.

It is assumed that cells C1 and C2 are placed adjacent to each other just before detailed routing as illustrated in FIG. 3, for example. In the cell C1, pins P_C11 and P_C12 are set in an M1 layer. In the cell C2, pins P_C21 and P_C22 are set in the M1 layer. In the cell C1, an inhibition area OBS_C11 is set in the M1 layer and an M2 layer, and an inhibition area OBS_C12 is set in the M2 layer. The M1 and M2 layers are wiring layers, and the M2 layer is above the M1 layer. Inhibition areas in the cell are indicated by hatching in a plan view (the same applies hereinafter).

Figure 4:
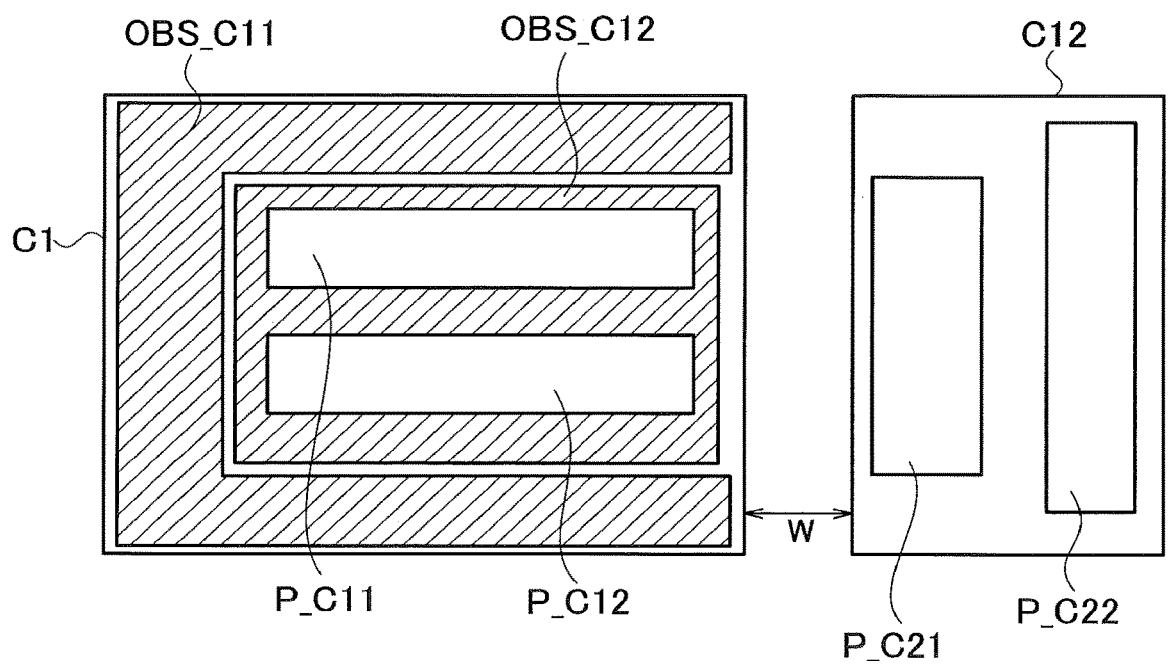
FIG. 4 is a schematic diagram illustrating a measure against a pin access problem in the design method of Comparative Example.

Wiring routes to the pins of the cell C1 from the right side of the page of FIG. 3 are blocked by the pins P_C21 and P_C22 of the cell C2. Wiring routes to the pins of the cell C1 in the other direction are blocked by the inhibition areas OBS_C11 and OBS_C12. Therefore, access to the pins of the cell C1 is impossible in detailed wiring. In order to enable access to the pins of the cell C1, it is necessary to move at least one of the cells C1 and C2 to provide spacing W between the cells C1 and C2 as illustrated in FIG. 4.

Figure 5:
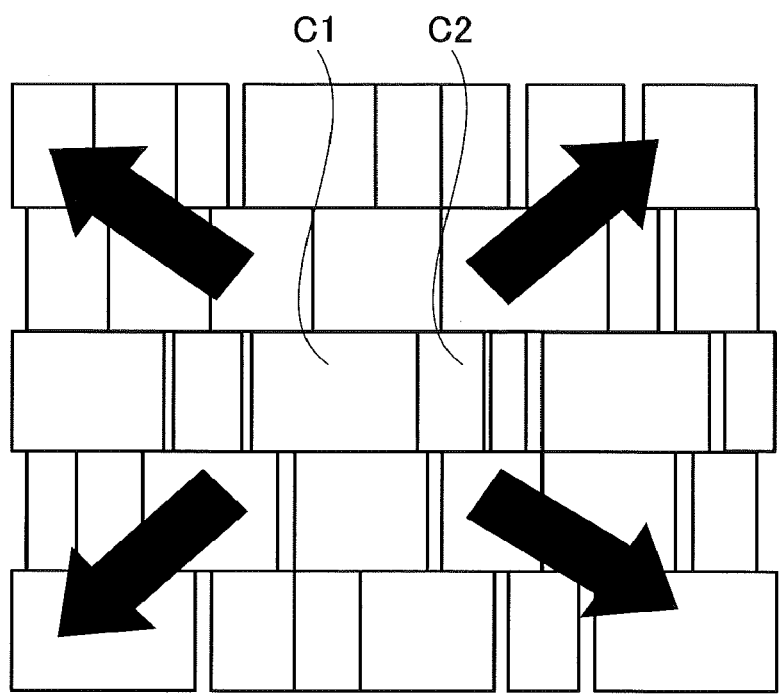
FIG. 5 is a schematic diagram illustrating an influence on cell placement in the design method of Comparative Example.

When cells are densely laid out as illustrated in FIG. 5, moving the cells C1 and C2 affects cells therearound, resulting in movement of a large number of cells as indicated by arrows in FIG. 5. This greatly changes the propagation timing of signals. When a pin access problem occurs, therefore, the design process needs to restart from cell placement (step S02). The product development thereby runs behind schedule, increasing the design costs.

In order to prevent the movement of a large number of cells, the spacing between all the cells may be widened in advance. However, such a measure increases the product chip size due to the margin in the cell placement region, thus increasing the manufacturing cost of semiconductor masks.

In contrast to the design method of Comparative Example, the design method of a semiconductor integrated circuit according to the first embodiment uses cells including pins easy to access in timing optimization as described below. This prevents the design process from going back in implementation design.

To be specific, in the pseudo-cell information creation process S100 illustrated in FIG. 1, cost of pin access of a cell (hereinafter, referred to as a cell cost) is calculated in order to quantify the difficulty of access to the pins of the cell. The cell cost is a value obtained by numerically quantifying the degree of difficulty of pin access. For example, the cell cost of a cell including pins that are more difficult to access is set to a higher value while the cell cost of a cell including pins that are easier to access is set to a lower value. Furthermore, in the pseudo-cell information creation process S100, pseudo-cell information that reflects the degree of difficulty of pin access, including a parameter weighed by cell cost is created.

In the circuit design process S200, with reference to the pseudo-cell information, cells having relatively low cell cost, that is, cells including pins easy to access are preferentially used in timing optimization. This prevents pin access problems involving a pin that cannot connect to a wire from occurring in detailed routing.

Figure 6:
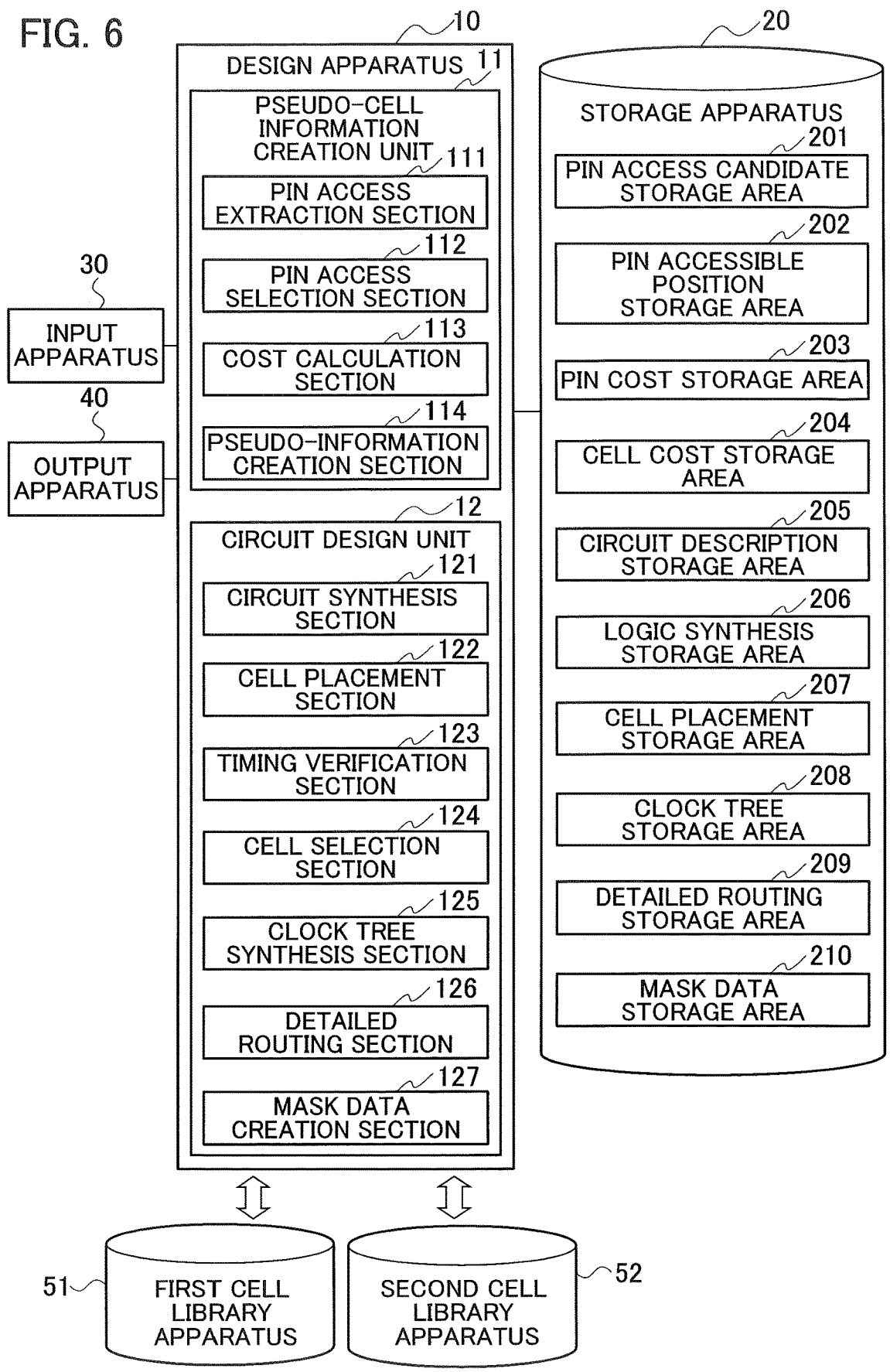
FIG. 6 is a schematic diagram illustrating the configuration of a circuit design system for a semiconductor integrated circuit according to the first embodiment.

The design method illustrated in FIG. 1 is implemented using a circuit design system illustrated in FIG. 6, for example. The circuit design system illustrated in FIG. 6 includes a design apparatus 10, which includes a pseudo-cell information creation unit and a circuit design unit 12, a storage apparatus 20, an input apparatus 30, an output apparatus 40, and first and second cell library apparatuses 51 and 52.

The pseudo-cell information creation unit 11 executes the steps of the pseudo-cell information creation process S100. The pseudo-cell information creation unit 11 creates pseudo-cell information that reflects degree of difficulty of pin access, for cells registered in the first cell library apparatus 51. The created pseudo-cell information is registered in the second cell library apparatus 52.

The circuit design unit 12 executes the steps of the circuit design process S200. The circuit design unit 12 executes timing optimization by preferentially using cells with relatively low difficulty of pin access with reference to the pseudo-cell information.

The storage apparatus 20 stores data that the design apparatus 10 uses to perform processing, results from processing of the design apparatus 10, and the like.

The input apparatus 30 includes a keyboard, a mouse, a light pen, a flexible disk apparatus, and the like. The input apparatus 30 allows a circuit designer to specify input and output data. The input apparatus 30 also allows the designer to set the format of output data and input instructions to execute or stop circuit designing. The output apparatus 40 can include a display and a printer to show the results of circuit design, a storage apparatus storing the results of circuit designing in a computer-readable storage medium, and the like. Herein, the computer-readable storage medium refers to a medium that is able to store electronic data, such as an external memory device for computers, a semiconductor memory, or a magnetic tape, for example.

The first and second cell library apparatuses 51 and 52 store cell library information used by the designing method illustrated in FIG. 1. The cell library information refers to a description file or a database concerning cell information including cell delay and area. The first cell library apparatus 51 contains cell information including original cell delay and area that do not reflect the cell cost. The second cell library apparatus 52 contains pseudo-cell information that reflects the cell cost.

Figure 7:
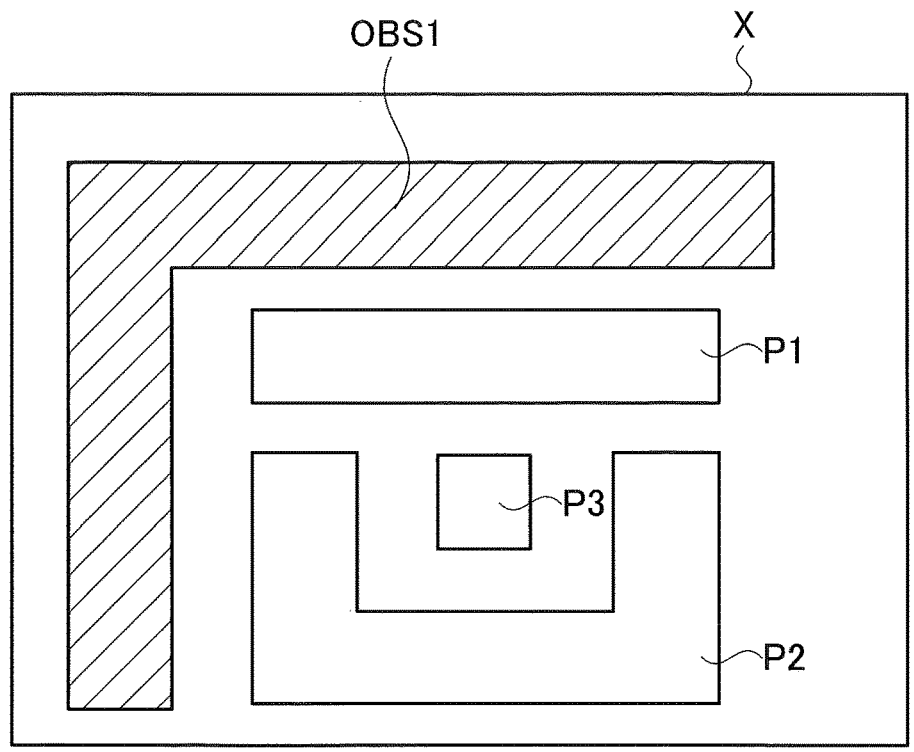
FIG. 7 is a schematic plan view illustrating a cell example for explaining the design method of a semiconductor integrated circuit according to the first embodiment.

The method of calculating the cell cost with the pseudo-cell information creation unit 11 is described using a cell X illustrated in FIG. 7. The cell X is one of cells having the cell information registered in the first cell library apparatus 51. The cell X illustrated in FIG. 7 includes pins P1, P2, and P3 set in an M1 layer. The area indicated by hatching in FIG. 7 is an inhibition area OBS1 of the cell X. The range of the inhibition area OBS1 is common to the M1 and M2 layers. The following describes pin access from the M1 layer, which is the layer where the pins of the cell X are placed, and pin access from the M2 layer, which is laid directly above the M1 layer. Wiring tracks are placed in the M1 layer, which is the first layer among the wiring layers, and in the M2 layer, which is the second layer.

First, pin access is considered in the case where wiring tracks in the M1 layer extend horizontally in the page of FIG. 7.

Figure 8:
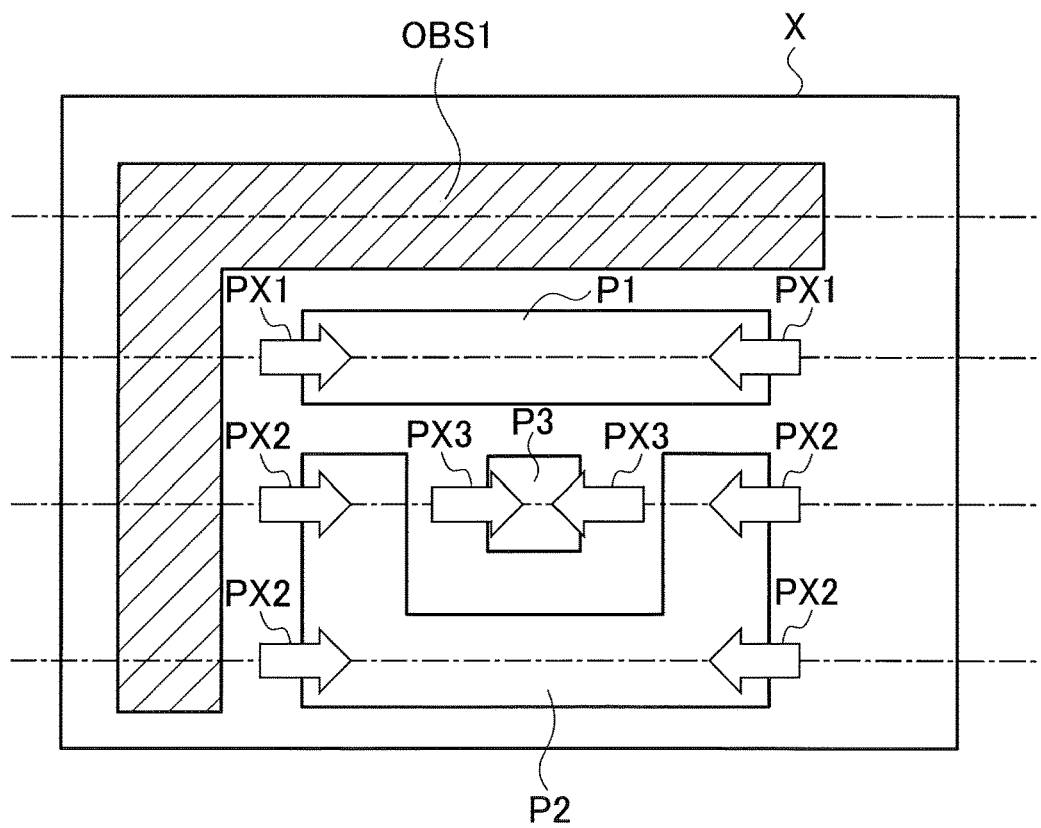
FIG. 8 is a schematic diagram illustrating pin access candidate examples.

In step S110 of FIG. 1, the pin access extraction section 111 extracts pin access candidates which are wiring routes accessing each pin of the cell X. In this phase, the influence of the other pins and the OBS1 is not taken into account. FIG. 8 illustrates the results of extracting the pin access candidates. In FIG. 8, dash-dot lines indicate positions of wiring tracks, and each arrow indicates the position of access to a pin and the direction that the wire extends with respect to the pin (the same applies hereinafter). In the following, pin accesses PX1 indicate pin access to the pin P1; pin accesses PX2 indicate pin access to the pin P2; and pin accesses PX3 indicate pin access to the pin P3. The results of extracting the pin access candidates are stored in a pin access candidate storage area 201 of the storage apparatus 20.

Figure 9:
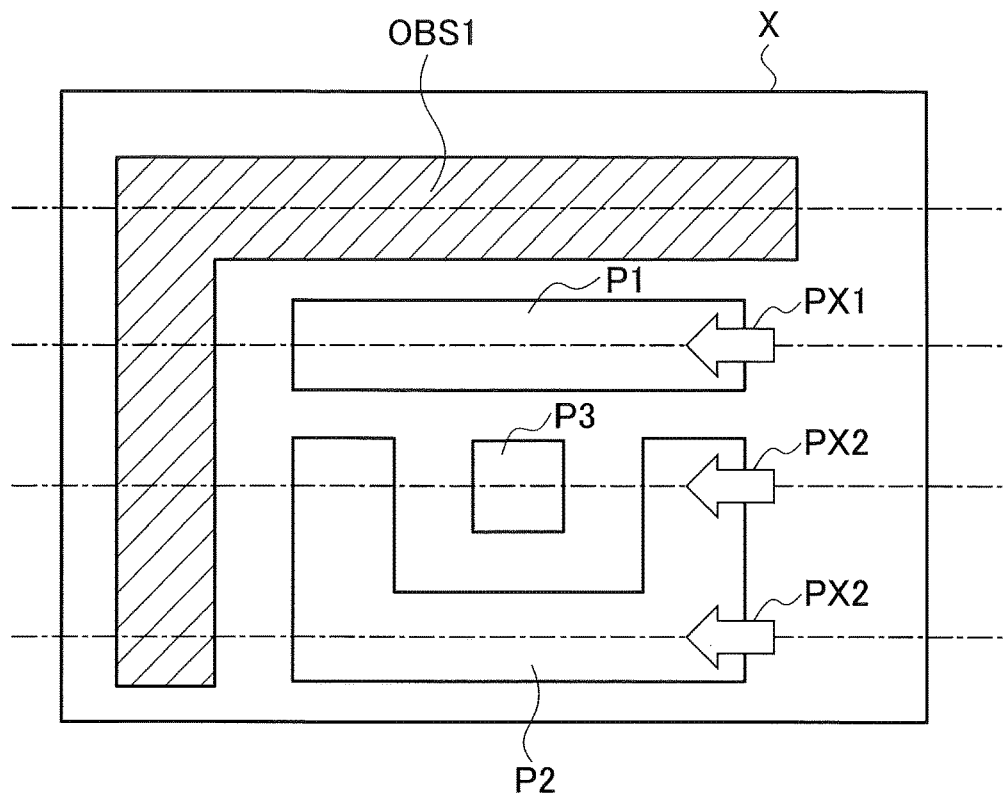
FIG. 9 is a schematic diagram illustrating pin accessible position examples.

In step S120, a pin access selection section 112 reads the pin access candidates from the pin access candidate storage area 201. The pin access selection section 112 selects pin accessible positions the wiring routes of which are not blocked by the other pins or inhibition area OBS1, from the pin access candidates. The result of selecting the pin accessible positions is illustrated in FIG. 9. As for the pins P1 to P3, wiring routes thereto from the left side in the page are blocked by the OBS1. The pins P1 to P3 are therefore not accessible from the left side. As for the pin P3, the wiring route thereto from the right side in the page is also blocked by the pin P2. The pin P3 is not accessible from the right side.

Therefore, as for the M1 layer, the pin P1 includes one pin accessible position; the pin P2 includes two pin accessible positions; and the P3 includes zero pin accessible position. The result of selecting the pin accessible positions is stored in pin accessible position storage area 202 of the storage apparatus 20.

As for the M2 layer in which wiring tracks extend vertically in the page, the pseudo-cell information creation unit 11 extracts pin access candidates and selects pin accessible positions in a similar manner to the M1 layer.

Figure 10:
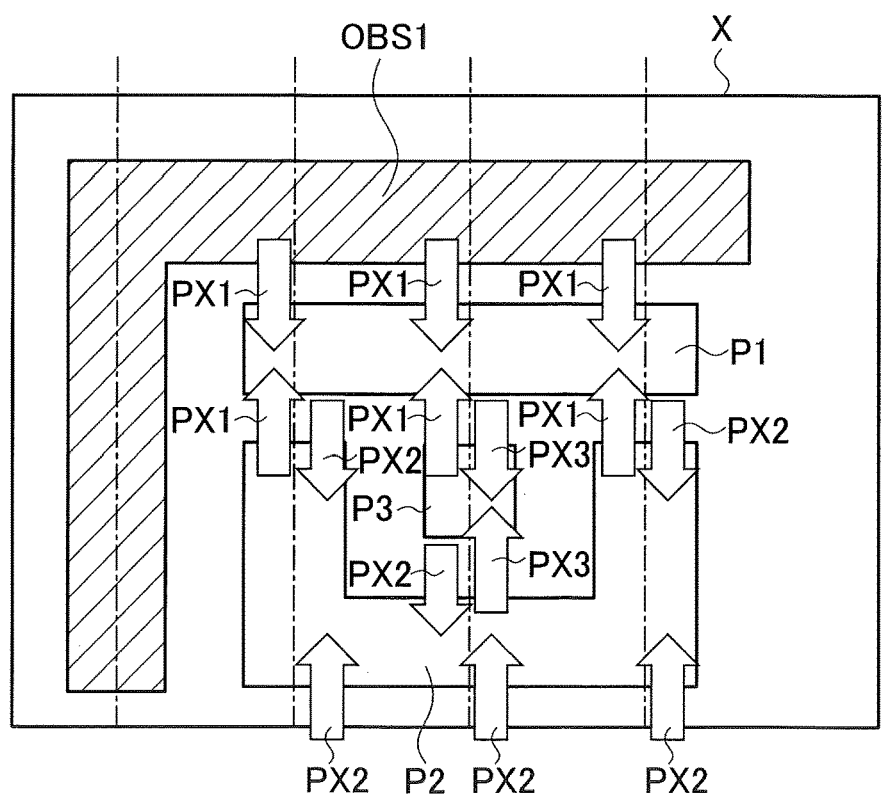
FIG. 10 is a schematic diagram illustrating pin access candidate examples.

To be specific, the pin access extraction section 111 extracts pin access candidates for each pin of the cell X in the M2 layer. The result of extracting the pin access candidates is illustrated in FIG. 10. Some of the positions of wiring routes of pin access overlap with each other, and the arrows indicating the same are illustrated off the wiring tracks as can be seen in FIG. 10. Subsequently, the pin access selection section 112 selects from the pin access candidates illustrated in FIG. 10, pin accessible positions the wiring routes to which are not blocked by the other pins and inhibition area OBS1. The result of selecting the pin accessible positions is illustrated in FIG. 11.

Since the pins P1 to P3 of the cell X are in the M1 layer, wiring routes extending from the bottom of the page in the M2 layer are not blocked by the other pins. The pins P1 to P3 are accessible from the bottom of the page. On the other hand, the wiring routes to all the pins P1 to P3 extending from the top of the page in the M2 layer are blocked by the inhibition area OBS1.

Figures 11, 12:
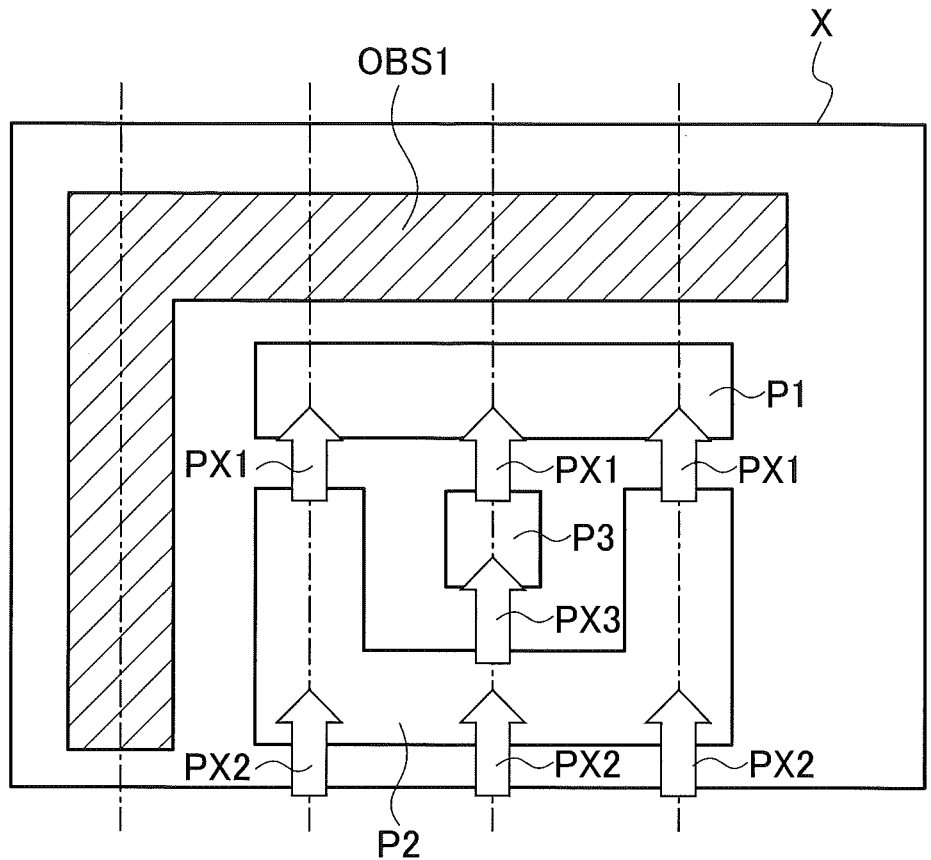
FIG. 11 is a schematic diagram illustrating pin accessible position examples.
FIG. 12 is a table illustrating pin cost examples.

As for the M2 layer, the pin P1 includes three pin accessible positions; the pin P2 includes three pin accessible positions; and the pin P3 includes one pin accessible position as illustrated in FIG. 11.

In step S130 of FIG. 1, a cost calculation section 113 calculates the cell cost of each cell based on the pin accessible positions read from the pin accessible position storage area 202. To be specific, the cost calculation section 113 calculates a pin cost reflecting the degree of difficulty of pin access for each pin of the cell and calculates the cell cost using the calculated pin costs. For example, the pin cost of a pin including a larger number of pin accessible positions is set lower. The pin cost of a pin easier to access is set lower while the pin cost of a pin less easy to access is set higher. The calculated pin costs are stored in a pin cost storage area 203 of the storage apparatus 20.

The pin costs illustrated in FIG. 12 are just an example. Pins including four or more pin accessible positions are considered to be most accessible, and the pin cost thereof is set to a standard value of "1". The pin cost as a coefficient is multiplied by a parameter included in the cell information as described later. The standard value is set to 1, which will not change the original value of the parameter when multiplied.

As for pins including less than four pin accessible positions, the pin cost increases in proportion to a decrease in number of pin accessible positions. The pin cost of pins not including any pin accessible position is set high in particular. However, the priority is set excessively low for cells with no pin accessible positions by setting the pin costs high. However, use of such cells is not prohibited. This allows circuit designing to be conducted without being stopped halfway in the process of design estimation intentionally employing cells of poor routability because of the absence of alternatives or other reasons. Such cells of poor routability can be addressed by reviewing of the cell design or the like after circuit designing, for example.

The cost calculation section 113 calculates the cell cost of each cell as an average of pin costs of all the pins included in the cell for example. Cell cost Cost_X of the cell X is calculated by the following formula (1):

$$\mathrm{Cost\_}X = (\mathrm{Cost}P1\_M1M2 + \mathrm{Cost}P2\_M1M2 + \mathrm{Cost}P3\_M1M2)/\mathrm{Pins\_num} \quad (1)$$

In formula (1),
CostP1_M1M2 is the pin cost of the pin P1 for pin access from the M1 or M2 layer;
CostP2_M1M2 is the pin cost of the pin P2 for pin access from the M1 or M2 layer;
CostP3_M1M2 is the pin cost of the pin P3 for pin access from the M1 or M2 layer; and
Pins_num is the number of pins of the cell X.

With Formula (1), the pin cost of each pin is calculated based on the total number of pin accessible positions in all the wiring layers, based on the table of FIG. 12, for example.

The cell cost of the cell X is calculated as follows based on the result of selecting the pin accessible positions illustrated in FIGS. 9 and 11.

The pin P1 includes one pin accessible position in the M1 layer and includes three pin accessible positions in the M2 layer. The pin P1 therefore includes four pin accessible positions in total, so CostP1_M1M2=1. The pin P2 includes two pin accessible positions in the M1 layer and includes three pin accessible positions in the M2 layer. The pin P2 therefore includes five pin accessible positions in total, so CostP2_M1M2=1. The pin P3 includes no pin accessible positions in the M1 layer and includes one pin accessible position in the M2 layer. The pin P3 therefore includes one pin accessible position in total, so CostP3_M1M2=4. The cell cost of the cell X is Cost_X=(1+1+4)/3=2.

The cost calculation section 113 calculates the cell cost based on the pin costs read from the pin cost storage area 203 as described above. The calculated cell cost is stored in a cell cost storage area 204 of the storage apparatus 20.

In step S140, then, a pseudo-information creation section 114 uses the cell cost stored in the cell cost storage area 204 to create pseudo-cell information including cell information reflecting the cell cost. The created pseudo-cell information is registered in the second cell library apparatus 52. For example, the pseudo-information creation section 114 creates pseudo-cell information by changing a part of the cell information of the cell X to cell information reflecting the cell cost.

The pseudo-cell information creation unit 11 performs the same cell cost calculation as that of the cell X for the cells registered in the first cell library apparatus 51 to calculate the cell cost of each cell. For the cells for which the cell cost is calculated, the pseudo-cell information creation unit 11 creates the pseudo-cell information reflecting the cell cost. The pseudo-cell information is registered in the second cell library apparatus 52.

An example of cell information registered in the first cell library apparatus 51 is illustrated in FIG. 13. The cell information illustrated in FIG. 13 includes the cell delay and area of the cells A to D.

An example of the pseudo-cell information registered in the second cell library apparatus 52 is illustrated in FIG. 14. The pseudo-cell information illustrated in FIG. 14 includes the cell cost, cell delay, and pseudo-cell area weighted by the cell cost, of the cells A to D. The pseudo-cell area is calculated by multiplying original cell area of each cell by the cell cost thereof as the coefficient. The pseudo-cell area is the pseudo-cell information reflecting the degree of difficulty of pin access.

In the case described above, the pins of each cell are set only in the M1 layer and are accessed from the M1 and M2 layers. Pin-accessible positions are extracted in the same manner when pins are set not only in the M1 layer but also in the M2 layer or higher layers or when pins are accessed from an M3 layer, which is above the M2 layer, and higher layers.

As for pin access from the M1 and M3 layers in which wiring tracks extend horizontally in the page, pin accessible positions in the M1 layer and pin accessible positions in the M3 layer can overlap with each other in some cases. As for pin access from the M2 and M4 layers in which wiring tracks extend vertically in the page, pin accessible positions in the M2 layer and pin accessible positions in the M4 layer can overlap with each other in some cases. When pin accessible positions overlap with each other in such a manner, the pin costs of a cell may be calculated by assuming that only a higher wiring layer is used for pin access. For example, when pin accessible positions in the M1 layer overlap with pin accessible positions in the M3 layer, the pin costs of the cell are calculated using only the M3 layer as the wiring layer while not using the M1 layer as the wiring layer. When pin accessible positions in the M2 layer overlap with pin accessible positions in the M4 layer, the pin costs of the cell are calculated using only the M4 layer as the wiring layer and not using the M2 layer as the wiring layer.

In the design method of a semiconductor integrated circuit according to the first embodiment, timing optimization in the circuit design process S200 is performed using pseudo-cell information. In the design method illustrated in FIG. 1, timing optimization is executed (steps S230, S250, and S270) after cell placement (step S220), after clock tree synthesis (step S240), and after detailed routing (step S260). On the other hand, logic synthesis (step S210), cell placement, clock tree synthesis, detailed routing, and semiconductor mask data creation (step S280) use original cell information not reflecting the cell cost.

Figure 15:
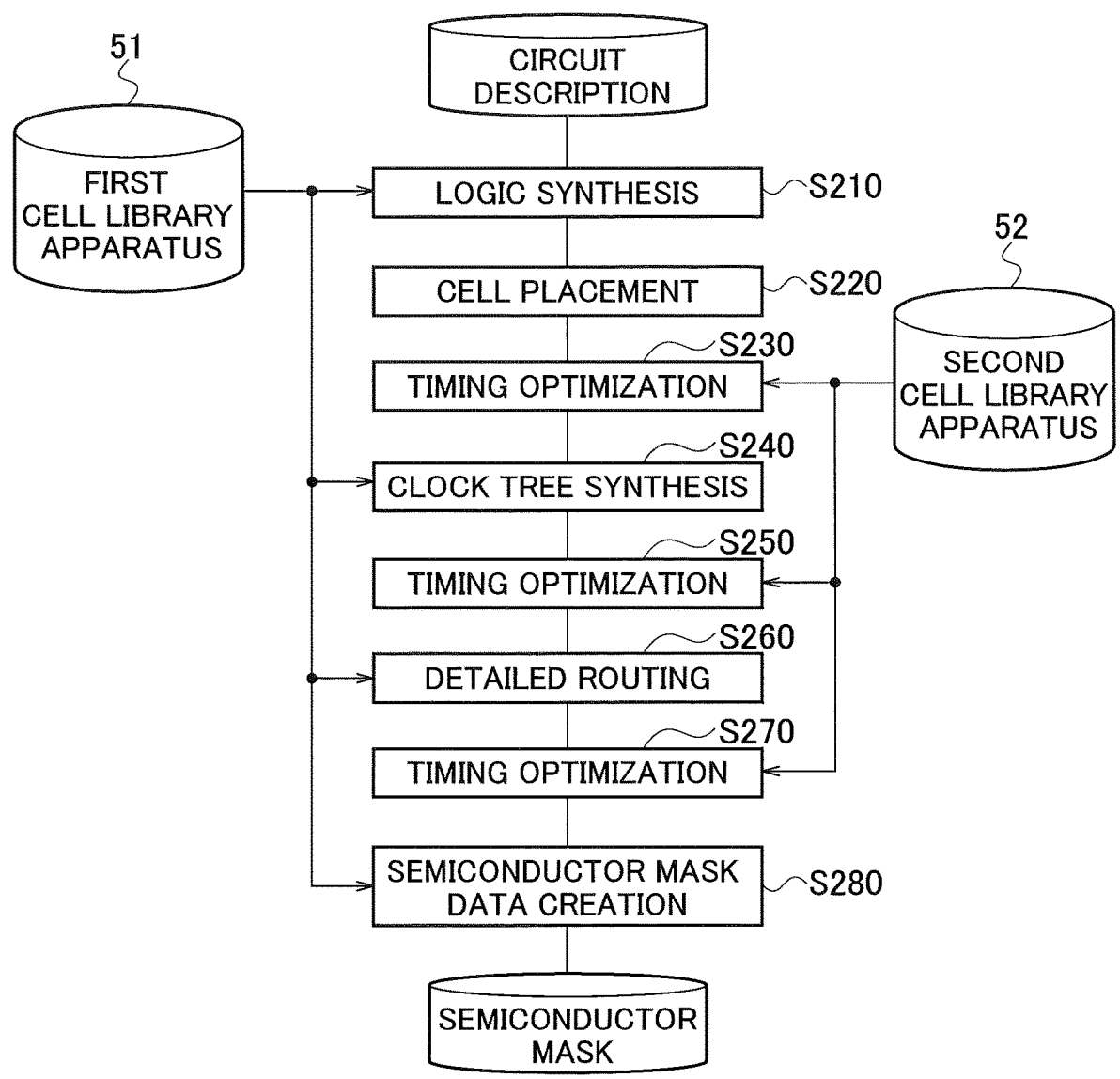
FIG. 15 is a schematic diagram illustrating cell library information which is referred to in the design method of a semiconductor integrated circuit according to the first embodiment.

FIG. 15 illustrates cell library information referred to in each step of the circuit design process S200, starting from circuit description to manufacturing of a semiconductor mask. As illustrated in FIG. 15, cell information registered in the first cell library apparatus 51 is used in each step of logic synthesis, clock tree synthesis, detailed routing, and semiconductor mask data creation. Pseudo-cell information registered in the second cell library apparatus 52 is used only in each step of timing optimization. The layout using the actual cell area allows for manufacturing of a precise semiconductor mask.

The following describes a method of executing the steps of the circuit design process S200 illustrated in FIG. 1 with the circuit design unit 12 illustrated in FIG. 6.

In step S210 of FIG. 1, a circuit synthesis section 121 reads circuit description of a circuit to be designed, stored in a circuit description storage area 205. The circuit synthesis section 121 selects cells with reference to the first cell library apparatus 51 based on the circuit description and executes logic synthesis. The circuit description can be stored in a circuit description storage area 205 through the input apparatus 30. The result of logic synthesis is stored in a logic synthesis storage area 206.

Next, in step S220, a cell placement section 122 places cells using the result of logic synthesis read from the logic synthesis storage area 206. The result of cell placement is stored in a cell placement storage area 207.

In step S230, a timing verification section 123 and a cell selection section 124 perform timing optimization for the result of cell placement. To be specific, when the timing verification section 123 detects a timing violation, the cell selection section 124 replaces, deletes, or adds cells. The detail of timing optimization is described later.

In step S240, a clock tree synthesis section 125 performs clock tree synthesis based on the cell placement. The result of clock tree synthesis is stored in a clock tree storage area 208. In step S250, then, the result of clock tree synthesis is subjected to timing optimization.

In step S260, a detailed routing section 126 performs detailed routing. The result of detailed routing is stored in a detailed routing storage area 209. In step S270, then, the result of detailed routing is subjected to timing optimization. Subsequently, a mask data creation section 127 creates semiconductor mask data for use in the manufacturing process of a semiconductor device based on the results of cell replacement and detailed routing. The created semiconductor mask data is stored in a mask data storage area 210.

The circuit design process S200 thus ends. The semiconductor mask data stored in the mask data storage area 210 can be outputted through the output apparatus 40.

Figure 16:
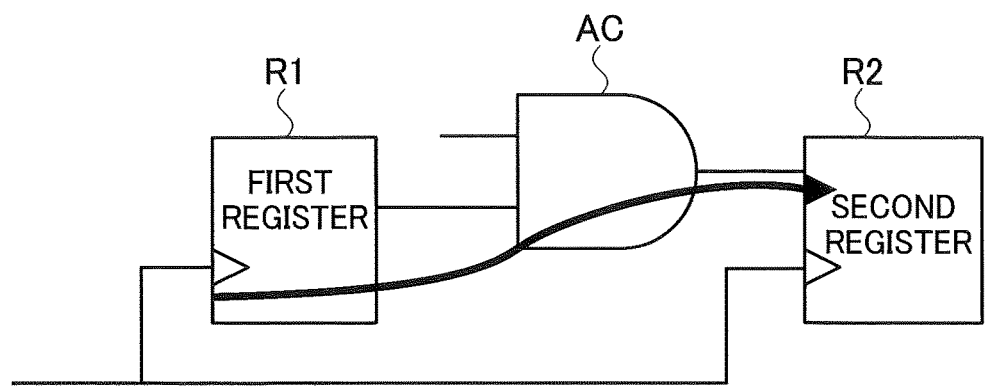
FIG. 16 is a circuit diagram example which is subjected to timing optimization.

The following describes timing optimization and cell replacement. In the following illustrative description, the object for timing optimization is a circuit illustrated in FIG. 16. In the circuit illustrated in FIG. 16, signal outputted from a first register R1 is inputted to a second register R2 via an AND circuit AC as indicated by an arrow.

In timing optimization in each step S230, S250, and S270 illustrated in FIG. 1, the timing verification section 123 verifies whether there is a violation of timing constraints. Herein, an AND circuit AC with a delay of 0.4 ns is located in a place with a timing margin of 0.2 ns, which produces a timing violation of 0.2 ns.

To correct the timing violation, the AND circuit AC, which is the cell violating the timing constraints, needs to be replaced with a cell with a delay of 0.2 ns or less. It is assumed herein that the cells A, B, C, and D illustrated in FIG. 13 are cell candidates for replacement that include equivalent functions to the violating cell. Based on the cell information registered in the first cell library apparatus 51 illustrated in FIG. 13, the AND circuit AC is replaced with the cell D. This is because the cell delay of the cells C and D is shorter among the cells A to D and the cell area of the cell D is smaller than the cell C. The cell D is therefore selected as the cell to be replaced when the degree of difficulty of pin access is not taken into account.

However, the cell D has a relatively high cell cost as illustrated in FIG. 14, and the pin access to the cell D is predicted to be difficult. Replacement of the AND circuit AC with the cell D, therefore, could lead to movement of a large number of cells as described with reference to FIGS. 3 to 5.

On the other hand, in the design method of a semiconductor integrated circuit according to the first embodiment, violating cells are replaced based on the pseudo-cell information registered in the second cell library apparatus 52. When the timing verification section 123 detects a timing constraint violation, the cell selection section 124 selects a cell to be replaced for the violating cell with reference to the pseudo-cell information that reflects the degree of difficulty of pin access. Specifically, among the cells C and D having shorter cell delays, the cell C, which has a smaller pseudo-cell area, is selected as the cell to be replaced for the AND circuit AC.

As described above, with the design method of a semiconductor integrated circuit according to the first embodiment, the cell C, which provides easier pin access than the cell D, is selected. This prevents such movement of a large number of cells and prevents the circuit design process from going back.

As described above, with the design method of a semiconductor integrated circuit according to the first embodiment, the degree of difficulty of pin access that connect wires to pins set in the cell (pin accessibility) is calculated as the cell cost, and timing optimization is performed using the pseudo-cell information that reflects the calculated cell cost. When there are plural cell candidates that can be replaced for a violating cell that violates timing constraints, therefore, it is determined which cell candidate includes pins easy to access, before detailed routing. This prevents use of a cell including pins that are difficult to access in a high-density cell layout region. It is therefore possible to prevent pin access problems involving a pin that cannot connect to a wire from occurring in detailed routing, thus eliminating the need to restart from cell placement. This prevents the production development from running behind schedule and increasing in design costs.

In the above description, the cell area, which is one of the parameters of cell information, is weighted according to the cell cost. The cell cost may be used to weight another parameter of the cell information, such as a cell delay, for example.

The design method of a semiconductor integrated circuit illustrated in FIG. 1 is executed by controlling the circuit design system illustrated in FIG. 6 with a control program having an equivalent algorithm to that of FIG. 1. The control program that executes instructions to control the circuit design system is stored in the storage apparatus 20 constituting the circuit design system illustrated in FIG. 6. The storage apparatus 20 is usable as a non-transitory computer-readable medium.

<Modification>

In the aforementioned example, the second cell library apparatus 52, that contains the pseudo-cell information, is referred to in timing optimization. However, another method is applicable. For example, implementation design may be performed with the design apparatus 10 equipped with a design database containing the pseudo-cell information.

Figure 17:
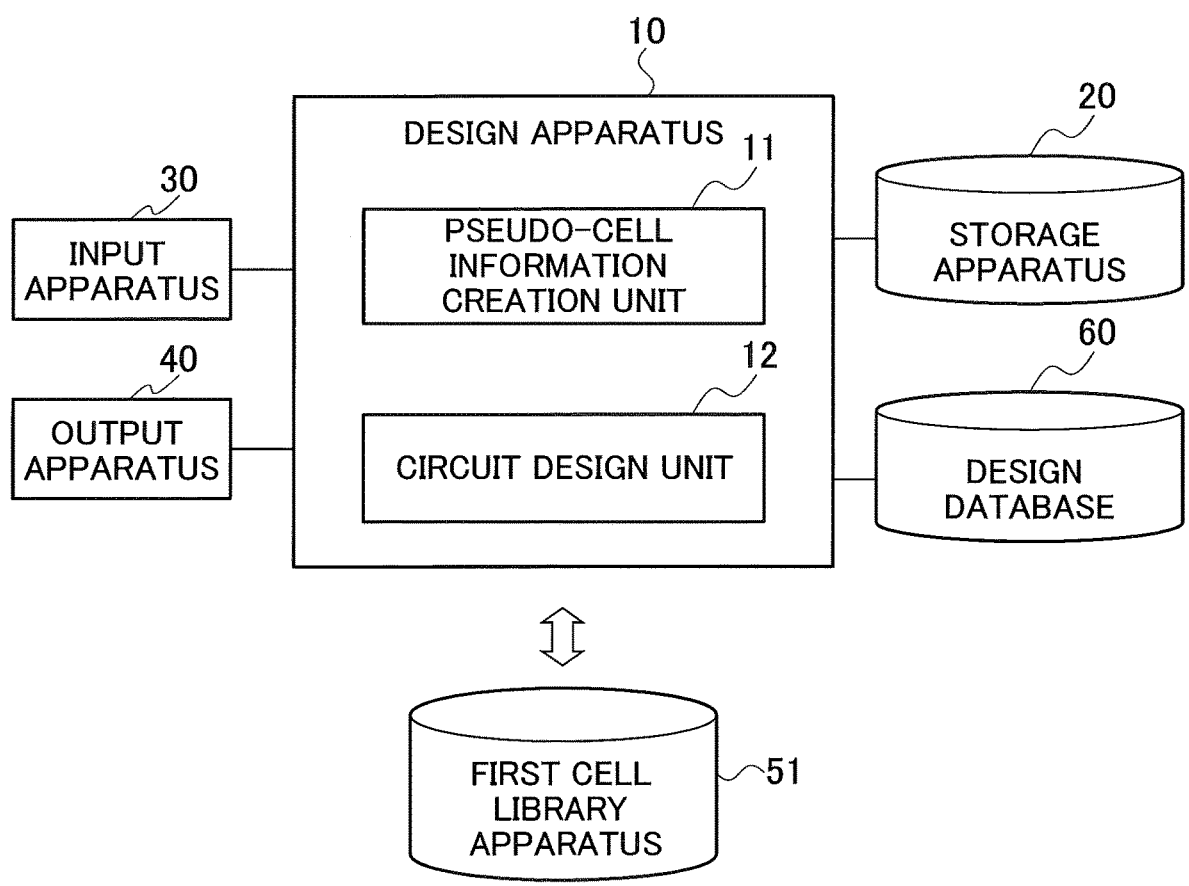
FIG. 17 is a schematic diagram illustrating the configuration of a circuit design system for a semiconductor integrated +circuit according to a modification of the first embodiment.

FIG. 17 illustrates an example of the design apparatus 10 equipped with a design database 60 that contains the pseudo-cell information. In the circuit design system illustrated in FIG. 17, the cell information registered in the first cell library apparatus 51 is transferred to the design database 60, and the pseudo-cell information creation unit 11 modifies the cell information of the design database 60 to the pseudo-cell information. This pseudo-cell information is used to perform timing optimization.

After timing optimization, the pseudo-cell information creation unit 11 may modify the pseudo-cell information inputted in the design database to original cell information that does not reflect the pin accessibility. In some processes, including checking a report of the cell area of the entire designed circuit, therefore, it is possible to confirm the results with the original cell area applied thereto.

Second Embodiments

A design method of a semiconductor integrated circuit according to a second embodiment takes into account cases where wiring routes that access different pins overlap with each other. As described in detail later, only the wiring route to one of the different pins is assigned as one of the pin accessible positions while the wiring route to the other pin is excluded from the pin accessible positions. According to the second embodiment, the cell cost is calculated with a higher degree of precision in the case where wiring routes that access different pins overlap with each or have the potential to overlap with each other on the same wiring track.

Figure 18:
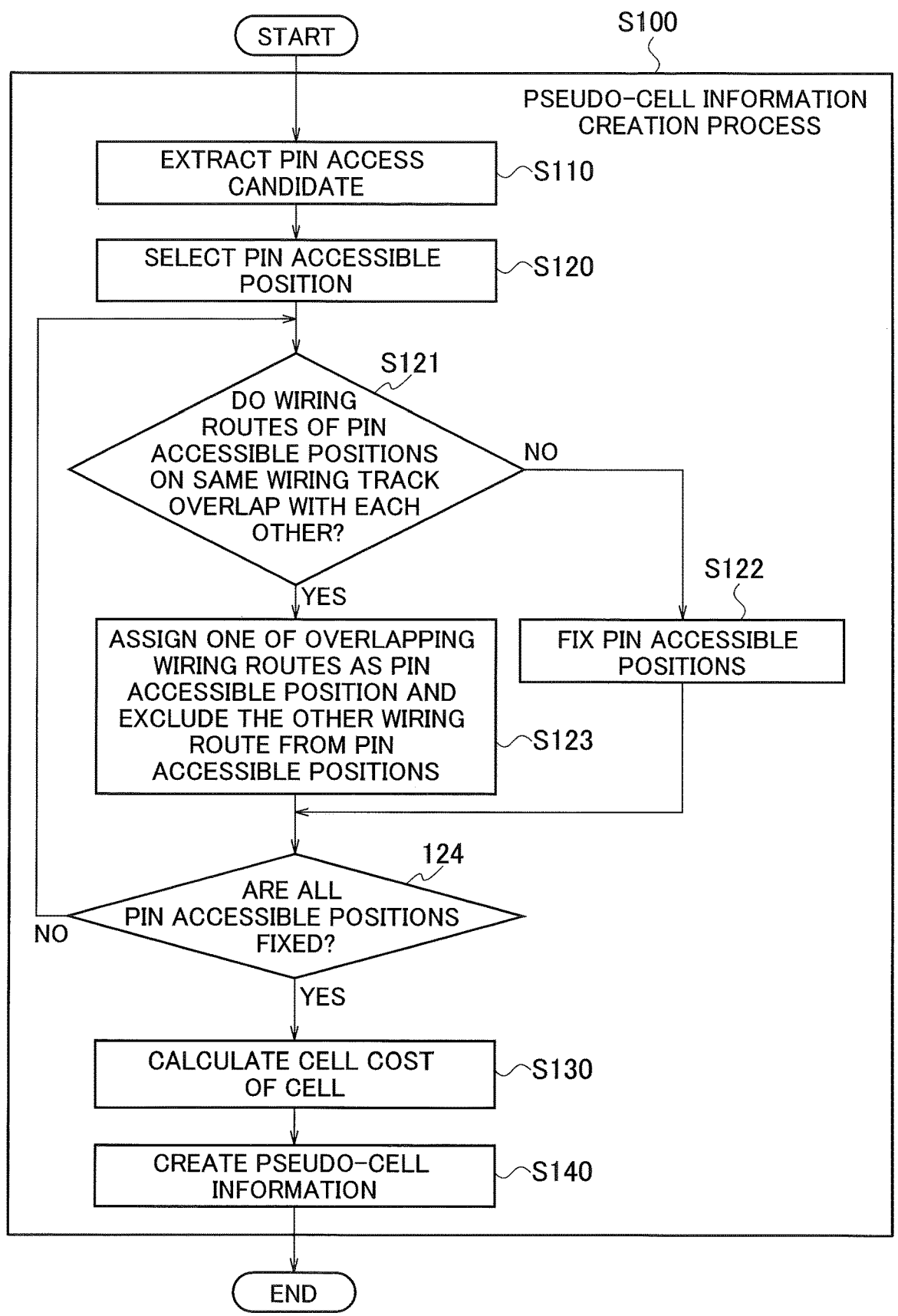
FIG. 18 is a flowchart for explaining a design method of a semiconductor integrated circuit according to a second embodiment.

FIG. 18 illustrates an example of the pseudo-cell information creation process S100 in the design method of a semiconductor integrated circuit according to the second embodiment. The flowchart illustrated in FIG. 18 is different from that of the first embodiment in that pin accessible positions are fixed depending on the result of determining whether wiring routes of some pin accessible positions overlap with each other on the same wiring track. Before description about the flowchart illustrated in FIG. 18, the method to fix pin accessible positions is described. In the following illustrative description, pins of the cell X illustrated in FIG. 7 are accessed from the M1 and M2 layers in a similar manner to the first embodiment. In the cell X, the pins P1, P2, and P3 are set in the M1 layer while the inhibition area OBS1 is set in the M1 and M2 layers.

Figure 19:
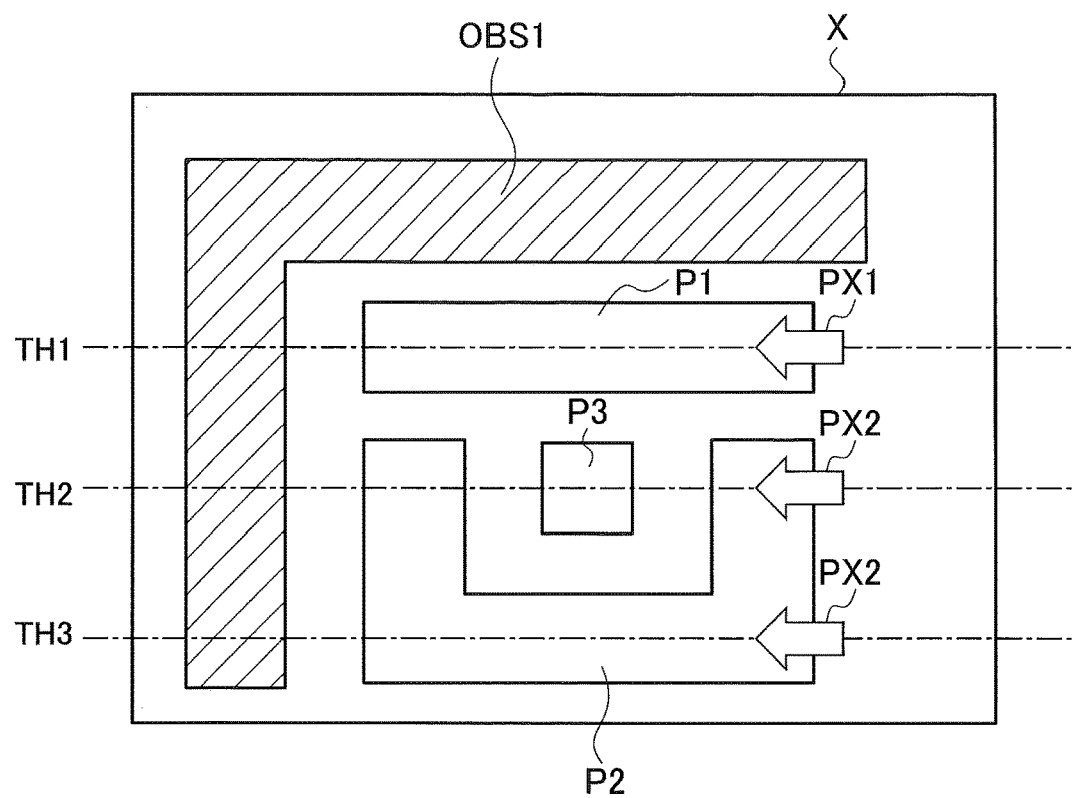
FIG. 19 is a schematic diagram illustrating pin accessible position examples.

FIG. 19 illustrates pin accessible positions in the M1 layer in which wiring tracks extend horizontally in the page. As illustrated in FIG. 19, for a wiring track TH1, a pin access PX1 is selected as one of the pin accessible positions. For wiring tracks TH2 and TH3, pin accesses PX2 are selected as the pin accessible positions. The wiring routes of the pin accessible positions therefore do not overlap with each other on the same wiring track. The pin access selection section 112 fixes the selected pin accessible positions.

Figure 20:
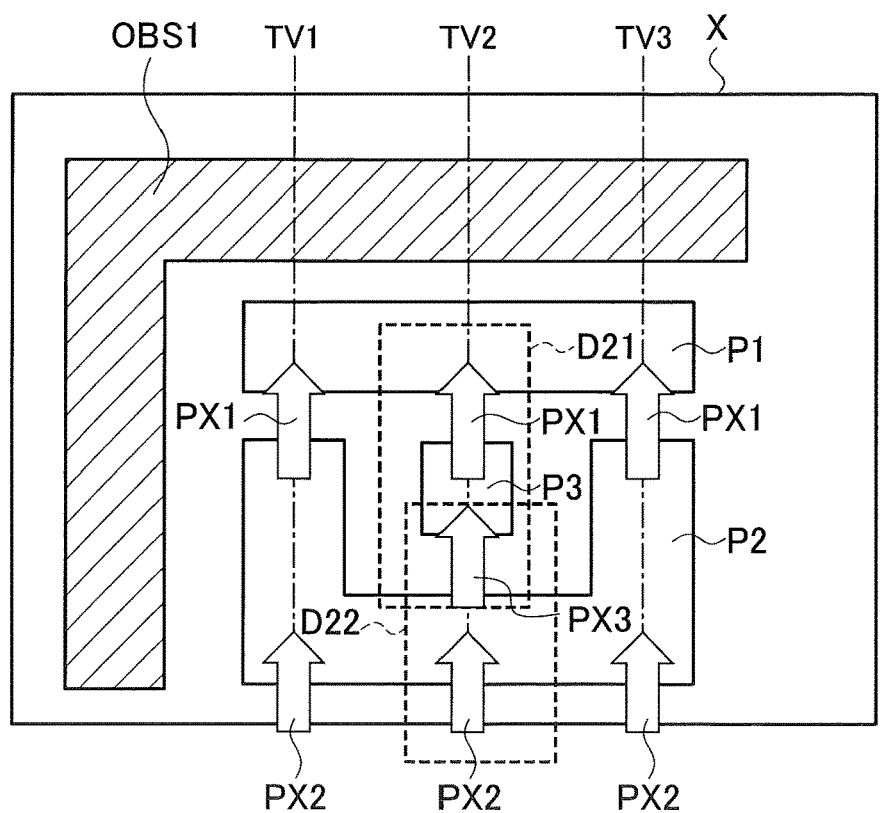
FIG. 20 is a schematic diagram illustrating pin accessible position examples the wiring routes of which overlap with each other.

As illustrated in FIG. 20, the wiring routes of pin accessible positions overlap with each other in the M2 layer where wiring tracks extend vertically in the page. On a wiring track TV2 in the M2 layer, as surrounded by dashed lines D21 and D22 in FIG. 20, pairs of wiring routes that access different pins overlap with each other and are different from any pair on the other wiring tracks. Hereinafter, a pair of wiring routes that satisfies the following conditions is referred to as an "overlapping access pair": the pair of wiring routes access different pins; the pair of wiring routes overlap with each other; and the pair of wiring routes is different from any pair of wiring routes on the other wiring tracks.

The overlapping access pair surrounded by the dashed line D21 in FIG. 20 is an overlapping access pair of the pin access PX1 to the pin P1 and the pin access PX3 to the pin P3 on the wiring track TV2. The overlapping access pair surrounded by the dashed line D22 in FIG. 20 is an overlapping access pair of the pin access PX2 to the pin P2 and the pin access PX3 to the pin P3 on the wiring track TV2. There is no overlapping access pair on the wiring tracks TV1 and TV3.

In an overlapping access pair, if the wiring route accessing one of the pins on the wiring track where the overlapping access pair is located is assigned as the pin accessible position, access to the other pin becomes impossible. The pin access selection section 112 therefore fixes the pin accessible positions in the following manner.

The pin access selection section 112 selects an overlapping access pair of wiring routes which is different from any pair on the other wiring tracks. In the selected overlapping access pair, the pin access selection section 112 assigns the wiring route accessing one of the pins as the pin accessible position and excludes the wiring route accessing the other pin from the pin accessible positions.

Figure 21:
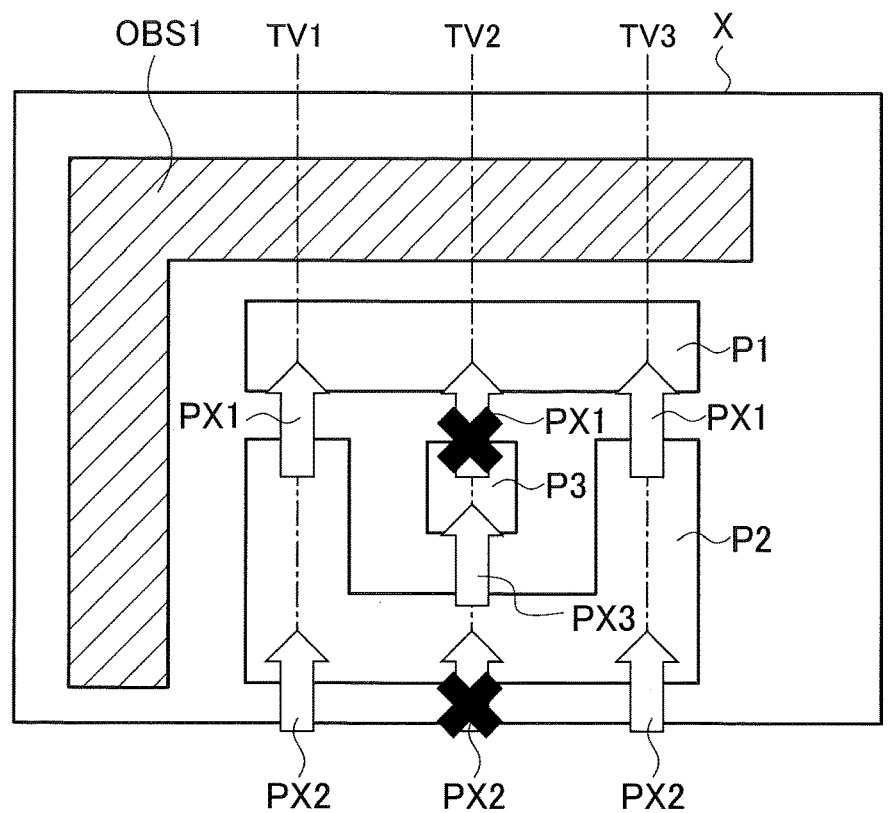
FIG. 21 is a schematic diagram illustrating an example in which pin accessible positions are fixed.

In an overlapping access pair, the pin access selection section 112 fixes the pin accessible positions by giving high priority to the access to a pin including a small number of pin accessible positions in total, for example. The pin access selection section 112 assigns the wiring route that accesses one of the pins including a relatively small number of pin accessible positions in total, as the pin accessible position. The pin access selection section 112 then excludes the wiring route that accesses the other pin including a relatively large number of pin accessible positions in total from the pin accessible positions. Specifically, as illustrated in FIG. 21, the pin access PX3 to the pin P3 on the wiring track TV2 is assigned as one of the pin accessible positions while the pin access PX1 to the pin P1 and the pin access PX2 to the pin P2 on the wiring tracks TV2 are excluded from the pin accessible positions. In FIG. 21, the excluded pin accesses PX1 and PX2 are indicated with X mark on the arrows.

As described above, when the pin including a small number of pin accessible positions in total includes one pin accessible position, the pin access to the pin of interest is assigned as one of the pin accessible positions while the pin access to the other pin is excluded from the pin accessible positions. Even when the pin including a small number of pin accessible positions in total includes two or more pin accessible positions, pin accessible positions can be assigned or excluded by giving high priority to the pin including a relatively small number of pin accessible positions in total.

In the overlapping access pair of the pin access PX1 to the pin P1 and the pin access PX3 to the pin P3, the pin P1 includes four pin accessible positions in total while the pin P3 includes one pin accessible position in total. The pin access selection section 112 therefore assigns the pin access PX3 to the pin P3 as one of the pin accessible positions and excludes the pin access PX1 to the pin P1 from the pin accessible positions. In the overlapping access pair of the pin access PX2 to the pin P2 and the pin access PX3 to the pin P3, the pin P2 includes five pin accessible positions in total while the pin P3 includes one pin accessible position. The pin accessible position of the pin P3 is already fixed as described above. The pin access selection section 112 therefore excludes the pin access PX2 to the pin P2 from the pin accessible positions without comparing the total number of pin accessible positions between the pins P2 and P3.

Some semiconductor integrated circuits include extensions formed around connections (VIAs) that electrically connect wiring layers laid in different tiers. Areas overlapping with extensions of VIAs may be defined as areas where pin accessible positions are not allowed to be placed. In order to define the range of each area that cannot be used as pin accessible positions, circuit design requires information about what type of structure the extension of each VIA has.

Figure 22:
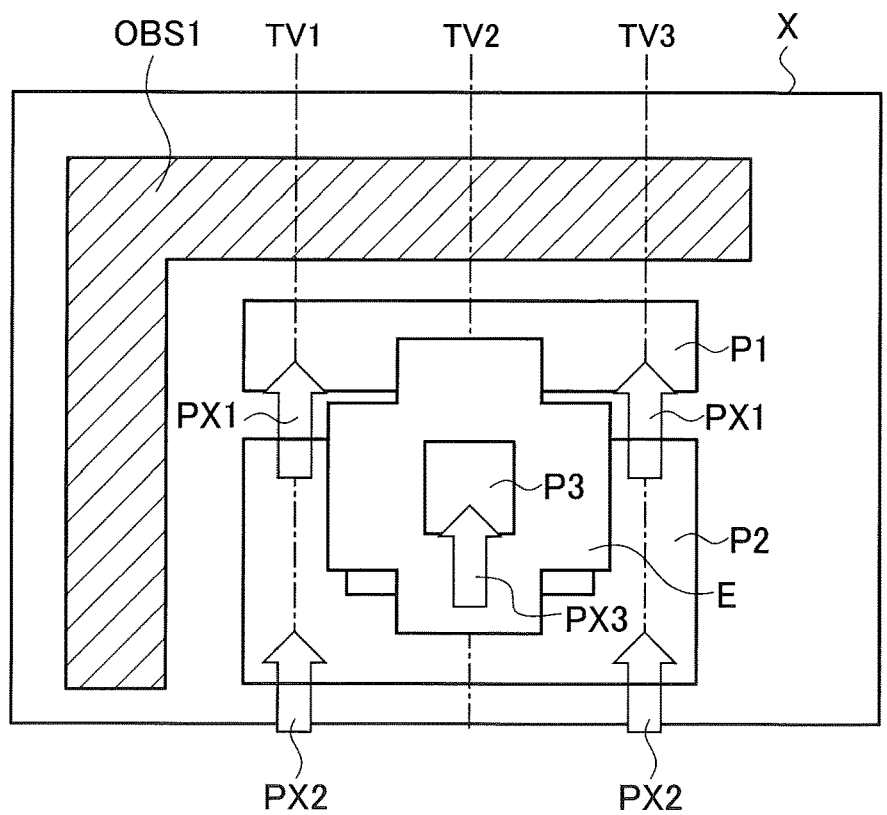
FIG. 22 is a schematic diagram illustrating a VIA extension example.

As illustrated in FIG. 22, when a VIA placed in the pin accessible position of the pin P3 on the wiring track TV2 includes an extension E, for example, wires placed on the wiring track TV2 overlap with the extension E of the VIA. The pin accesses PX1 and PX2 to the pins P1 and P2 on the wiring track TV2 are therefore excluded from the pin accessible positions.

As described above, the pin accesses PX1 and PX2 to the pins P1 and P2 on the wiring track TV2 are excluded from the pin accessible positions because the following conditions 1 to 3 are all satisfied.
Condition 1: the pin P3 includes one pin accessible position;
Condition 2: high priority is given to the pin accessible position of the pin P3 including a small number of pin accessible positions in total; and
Condition 3: the pin accessible positions of the pins P1 and 22 on the wiring track TV2 overlap with the extension E of the VIA that is placed on the pin accessible position of the pin P3.
When one of the pins of an overlapping access pair satisfies any one of the aforementioned conditions 1 to 3, the pin access to the other pin of the overlapping access pair is excluded from the pin accessible positions.

The following describes the steps of the flowchart of the pseudo-cell information creation process S100 illustrated in FIG. 18. First, in step S110 and step S120 of FIG. 18, the pin access extraction section 111 extracts pin access candidates, and the pin access selection section 112 selects pin accessible positions.

Subsequently, in step S121, the pin access selection section 112 determines whether wiring routes of some pin accessible positions overlap with each other on the same track. When the wiring routes of pin accessible positions do not overlap with each other on the same track, the process proceeds to the step S122, and the pin access selection section 112 assigns the selected pin accessible position as one of the pin accessible positions. In step S124, it is determined whether all the pin accessible positions are fixed. When all the pin accessible positions are fixed already, the process proceeds to the step S130. When any pin accessible positions is not fixed, the process returns to the step S121.

On the other hand, when wiring routes of some pin accessible positions overlap with each other on the same track, the process proceeds to the step S123. In the step S123, for the overlapping access pair thereof, the pin access selection section 112 assigns the wiring route of the pin access to one of the pins as one of the pin accessible positions. The pin access selection section 112 excludes the wiring route of the pin access to the other pin from the pin accessible positions. The process proceeds to the step S124, and it is determined whether all the pin accessible positions are fixed. When all the pin accessible positions are fixed, the process proceeds to the step S130. When any pin accessible position is not fixed, the process returns to the step S121.

After all the pin accessible positions are fixed, in a similar manner to the method described in the first embodiment, the cost calculation section 113 calculates the cell cost in the step S130, and the pseudo-information creation section 114 creates pseudo-cell information in step S140. The circuit design unit 12 then executes timing optimization with reference to the created pseudo-cell information.

In the above description, the method takes into account cases where wiring routes of pin accesses are ensured to overlap with each other. In addition, the method may take into account cases where wiring routes of pin accesses are not ensured to but do have the potential to overlap with each other.

Figure 23:
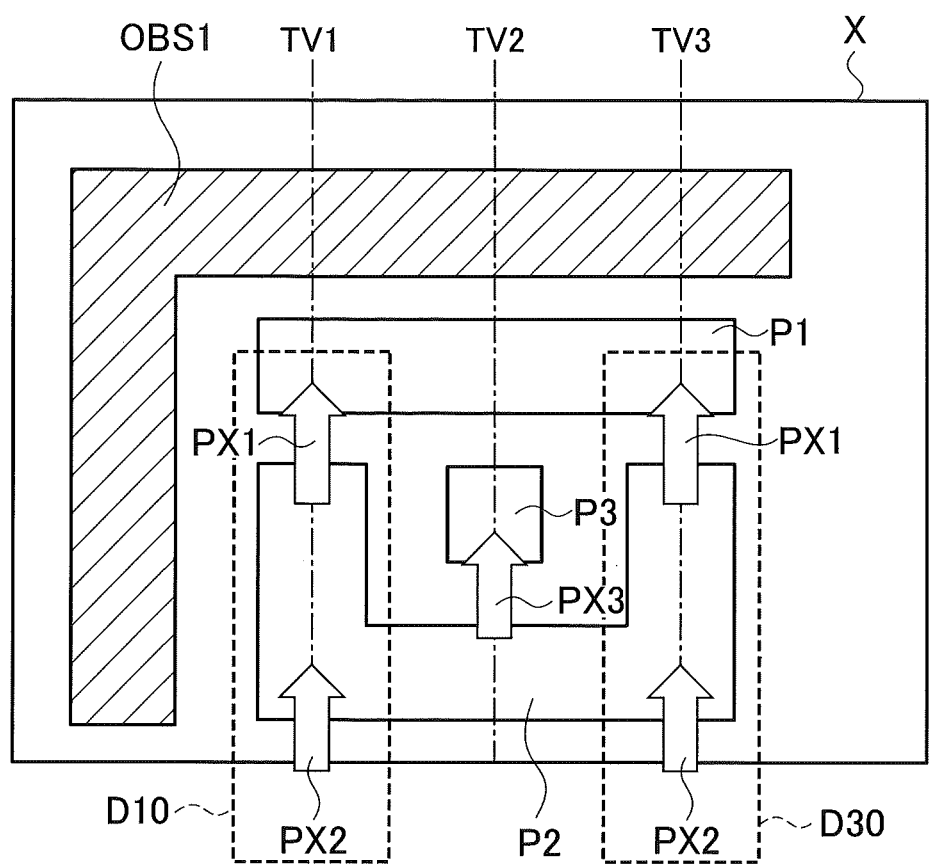
FIG. 23 is a schematic diagram illustrating pin accessible position examples the wiring routes of which have the potential to overlap with each other.

For example, the method takes into account cases where identical pairs of pin accessible positions are located on different wiring tracks, as illustrated in FIG. 23. In the example illustrated in FIG. 23, the pair of the pin access PX1 to the pin P1 and the pin access PX2 to the pin P2 on the wiring track TV1 (surrounded by dashed line D10) is the same as the pair of the pin access PX1 to the pin P1 and the pin access PX2 to the pin P2 on the wiring track TV3 (surrounded by dashed line D30). As for the wiring track TV2, the pin accessible position is fixed, and the same pair of the pin access PX1 and pin access PX2 is not located.

When identical pairs of pin accessible positions are located on different wiring tracks, the wiring routes thereof have the potential to overlap with each other. In such a case, the pseudo-cell information creation unit 11 fixes the pin accessible positions according to the flowchart illustrated in FIG. 24.

Figure 24:
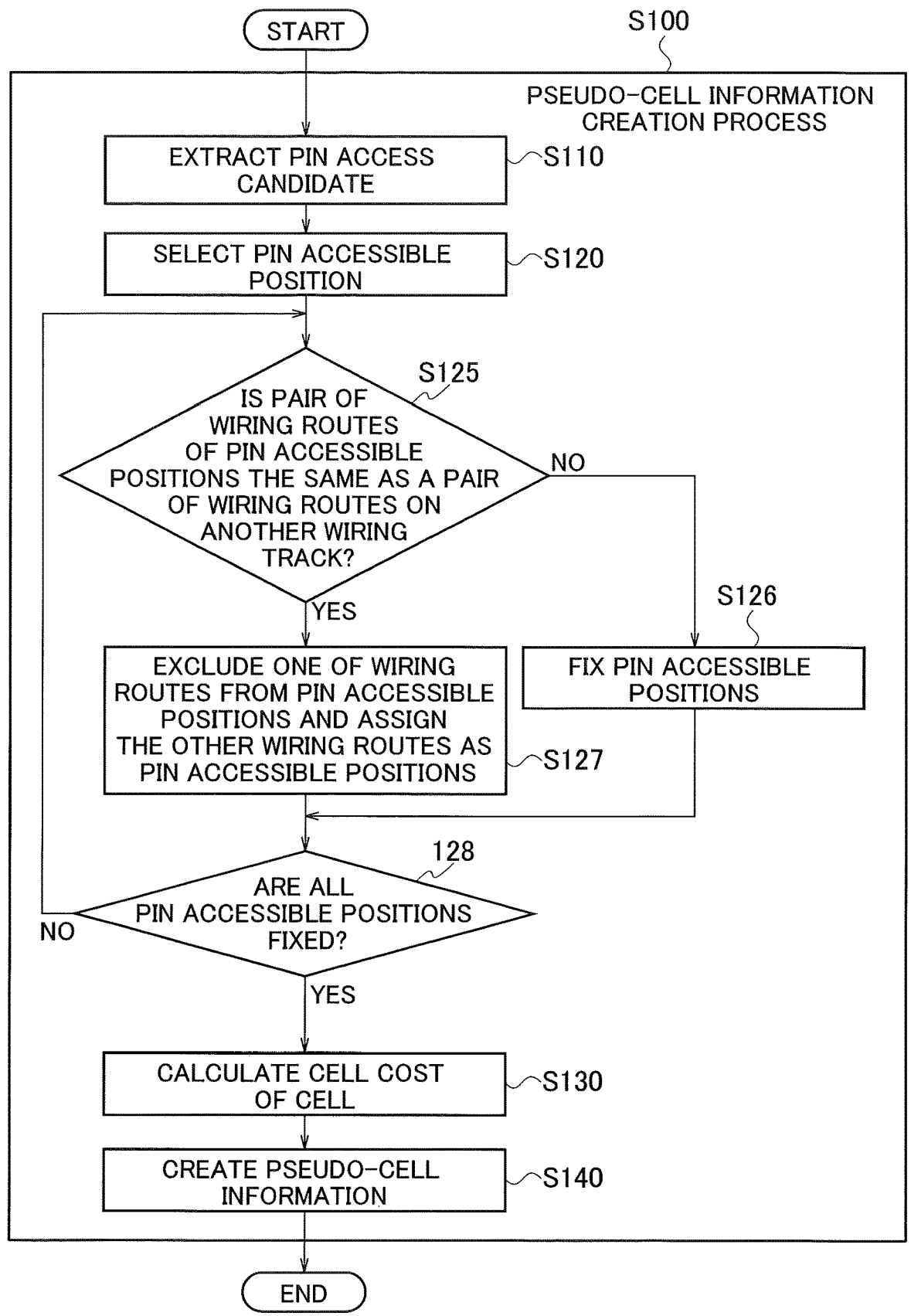
FIG. 24 is a flowchart for explaining another design method of a semiconductor integrated circuit according to the second embodiment.

First, in step S110 and step S120 of FIG. 24, the pin access extraction section 111 extracts pin access candidates, and the pin access selection section 112 selects pin accessible positions. In step S125, the pin access selection section 112 determines whether the pair of the wiring routes of pin accessible positions on a wiring track is the same as any pair of wiring routes on another wiring track. When the pair of wiring routes of pin accessible positions on a wiring track is not the same as any pair on the other wiring tracks, the process proceeds to step S126, and the pin access selection section 112 fixes the selected pin accessible positions. The process then proceeds to step S128, and it is determined whether all the pin accessible positions are fixed. When all the pin accessible positions are fixed, the process proceeds to the step S130. When any pin accessible position is not fixed, the process returns to the step S125.

When the pair of the wiring routes of pin accessible positions on a wiring track is the same as any pair of wiring routes on another wiring track, the process proceeds to step S127. The pin access selection section 112 excludes any one of the wiring routes thereof from the pin accessible positions and assigns the other wiring routes as the pin accessible positions. The process proceeds to the step S128, and it is determined whether all the pin accessible positions are fixed.

For example, the pin access selection section 112 excludes from the pin accessible positions, one pin access among the pair of pin accesses surrounded by the dashed line D10 and the pair of pin accesses surrounded by the dashed line D30. The pin access selection section 112 then assigns the other pin accesses as the pin accessible positions. In this process, the pin access selection section 112 preferentially assigns the pin access to a pin including a relatively small number of pin accessible positions in total as the pin accessible position.

Figure 25:
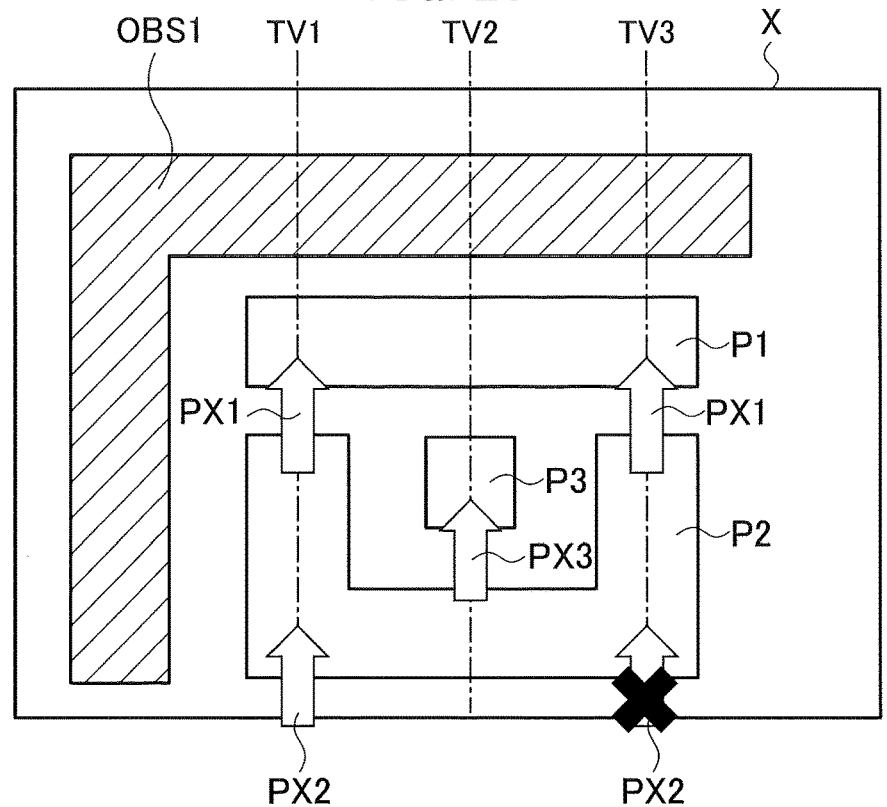
FIG. 25 is a schematic diagram illustrating an example in which pin accessible positions are fixed.
Figure 26:
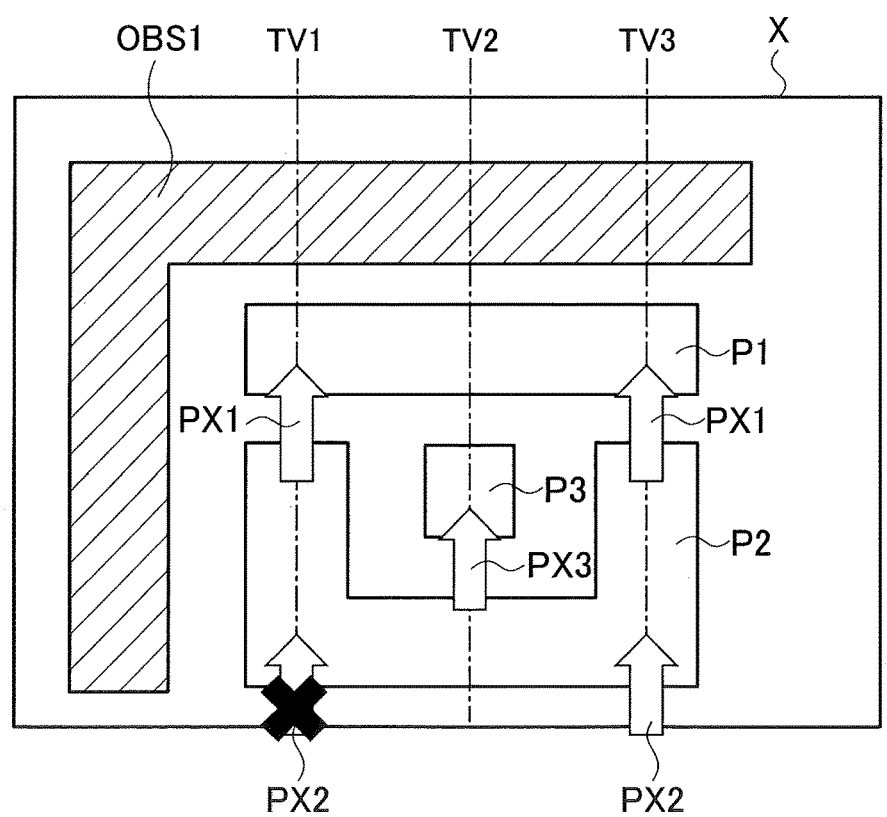
FIG. 26 is a schematic diagram illustrating another example in which pin accessible positions are fixed.

As indicated by X on an arrow in FIG. 25, the pin access selection section 112 excludes the pin access PX2 on the wiring track TV3 from the pin accessible positions. Alternatively, as indicated by X on an arrow in FIG. 26, the pin access selection section 112 excludes the pin access PX2 on the wiring track TV1 from the pin accessible positions.

After all the pin accessible positions are fixed as described above, the cost calculation section 113 calculates the cell cost in the step S130, and the pseudo-information creation section 114 creates pseudo-cell information in the step S140. The circuit design unit 12 executes timing optimization with reference to the created pseudo-cell information.

As described above, with the design method of a semiconductor integrated circuit according to the second embodiment, the cell cost of each cell is calculated by taking into account, overlap of wiring routes of pin access. When wiring routes of pin access are ensured to or have the potential to overlap with each other, any unusable wiring route of pin access are excluded from the pin accessible positions. It is thereby possible to determine cells including pins that are easy to access, with a high degree of precision, before detailed routing.

With the design method according to the first embodiment, as already described, the cell cost of the cell X is $Cost\_X=(1+1+4)/3=2$. With the design method according to the second embodiment, unusable pin accessible positions are excluded, and the cell cost of the cell X is $Cost\_X=(2+2+4)/3=2.67$. With the design method according to the second embodiment, that takes into account, overlap of wiring routes of pin access, the cell cost of the cell X is higher than that of the first embodiment.

While certain embodiments have been described, these embodiments have been presented by way of example only, and are not intended to limit the scope of the inventions. Indeed, the novel embodiments described herein may be embodied in a variety of other forms: furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A design method of a semiconductor integrated circuit using a design apparatus, the method comprising:
    creating pseudo-cell information for cells included in cell library information by a pseudo-cell information creation unit, the pseudo-cell information reflecting a degree of difficulty of pin access in connecting pins in the cells to wires;

employing one of the cells with a low difficulty of pin access with reference to the pseudo-cell information, in a timing optimization performed by a circuit design unit; and conducting implementation design including (1) in performing the timing optimization, referring to the pseudo-cell information inputted in a design database provided for a design apparatus, and (2) after the timing optimization, referring to cell information which is registered in a cell library apparatus and that does not reflect the degree of difficulty of pin access.

2. The design method of a semiconductor integrated circuit according to claim 1, wherein the creating the pseudo-cell information includes:

calculating a cell cost by quantifying the degree of difficulty of pin access;

calculating a pseudo-cell area by weighting a cell area of the cells according to the cell cost; and creating the pseudo-cell information including the pseudo-cell area.

3. The design method of a semiconductor integrated circuit according to claim 2, wherein in the timing optimization, a violating cell that violates timing constraints is replaced with a cell candidate that is selected from a plurality of cell candidates and has a smallest pseudo-cell area among the plurality of cell candidates.

4. The design method of a semiconductor integrated circuit according to claim 2, wherein for each of the pins in the cells, pin accessible positions are selected as wiring routes that allow for the pin access; and using pin costs of the pins in the cells, the cell cost is calculated as an average of pin costs of the pins in the cells, and the pin cost of each pin including a larger number of the pin accessible positions in total is set lower.

5. The design method of a semiconductor integrated circuit according to claim 4, wherein when wiring routes of the pin access to different pins selected from the pins overlap with each other, the wiring route of the pin access to one of the different pins including a smaller number of the pin accessible positions in total is assigned as one of the pin accessible positions, and the wiring route of the pin access to the other pin including a larger number of the pin accessible positions in total is excluded from the pin accessible positions.

6. The design method of a semiconductor integrated circuit according to claim 1, wherein the conducting the implementation design further includes logic synthesis, cell placement, clock tree synthesis, detailed wiring, and semiconductor mask data creation, the timing optimization is performed after the cell placement, after the clock tree synthesis, and after the detailed wiring, and the logic synthesis, cell placement, clock tree synthesis, detailed wiring, and semiconductor mask data creation is performed using the cell information that does not reflect the degree of difficulty of pin access.

7. The design method of a semiconductor integrated circuit according to claim 1, wherein after the timing optimization, the pseudo-cell information inputted in the design database is modified to the cell information that does not reflect the degree of difficulty of pin access.

8. A circuit design system for a semiconductor integrated circuit, comprising:

a pseudo-cell information creation unit configured to create pseudo-cell information for cells included in cell library information, the pseudo-cell information reflecting a degree of difficulty of pin access in connecting pins in the cells to wires;

a circuit design unit configured to use one of the cells with a low difficulty of pin access with reference to the pseudo-cell information in a timing optimization;

a first cell library in which cell information not reflecting the degree of difficulty of pin access is registered; and a second cell library in which the pseudo-cell information is registered, wherein the circuit design unit conducts implementation design including (1) in performing the timing optimization, referring to the pseudo-cell information inputted in a design database provided for a design apparatus, and (2) after the timing optimization, referring to the cell information which is registered in the first cell library and that does not reflect the degree of difficulty of pin access, wherein the circuit design unit:

conducts the timing optimization after cell placement, after clock tree synthesis, and after detailed wiring, and uses the cell information that does not reflect the degree of difficulty of pin access in logic synthesis, the cell placement, the clock tree synthesis, the detailed wiring, and semiconductor mask data creation.

9. The circuit design system for a semiconductor integrated circuit according to claim 8, wherein the pseudo-cell information creation unit:

calculates a cell cost by quantifying the degree of difficulty of pin access, calculates a pseudo-cell area by weighting cell area of the cells according to the cell cost; and creates the pseudo-cell information including the pseudo-cell area.

10. The circuit design system for a semiconductor integrated circuit according to claim 9, wherein in the timing optimization, the circuit design unit replaces a violating cell that violates timing constraints with a cell candidate that is selected from a plurality of cell candidates and has a smallest pseudo-cell area among the plurality of cell candidates.

11. The circuit design system for a semiconductor integrated circuit according to claim 9, wherein the pseudo-cell information creation unit for each of the pins in the cells, selects pin accessible positions as wiring routes that allow for the pin access;

using pin costs of the pins in the cells, calculates the cell cost as an average of the pin costs of the pins in the cells; and the pin cost of each pin including a larger number of the pin accessible positions in total is set lower.

12. The circuit design system for a semiconductor integrated circuit according to claim 11, wherein when wiring routes of the pin access to different pins selected from the pins overlap with each other, the pseudo-cell information creation unit assigns the wiring route of the pin access to one of the different pins including a smaller number of the pin accessible positions in total as one of the pin accessible positions, and excludes the wiring route of the pin access to the other pin including a larger number of the pin accessible positions in total from the pin accessible positions.

13. A circuit design system for a semiconductor integrated circuit, comprising:

a pseudo-cell information creation unit configured to create pseudo-cell information for cells included in cell library information, the pseudo-cell information reflecting a degree of difficulty of pin access in connecting pins in the cells to wires;

a circuit design unit configured to use one of the cells with a low difficulty of pin access with reference to the pseudo-cell information in a timing optimization;

a cell library apparatus in which cell information that does not reflect the degree of difficulty of pin access is registered; and a design database in which the pseudo-cell information is inputted, wherein the circuit design unit conducts implementation design including (1) in performing the timing optimization, referring to the pseudo-cell information inputted in a design database provided for a design apparatus, and (2) after the timing optimization, referring to the cell information which is registered in the cell library apparatus and that does not reflect the degree of difficulty of pin access.

14. The circuit design system for a semiconductor integrated circuit according to claim 13, wherein the pseudo-cell information creation unit:

calculates a cell cost by quantifying the degree of difficulty of pin access, calculates a pseudo-cell area by weighting cell area of the cells according to the cell cost; and creates the pseudo-cell information including the pseudo-cell area.

15. The circuit design system for a semiconductor integrated circuit according to claim 14, wherein in the timing optimization, the circuit design unit replaces a violating cell that violates timing constraints with a cell candidate that is selected from a plurality of cell candidates and has a smallest pseudo-cell area among the plurality of cell candidates.

16. The circuit design system for a semiconductor integrated circuit according to claim 14, wherein the pseudo-cell information creation unit:

for each of the pins in the cells, selects pin accessible positions as wiring routes that allow for the pin access;

using pin costs of the pins in the cells, calculates the cell cost as the average of the pin costs of the pins in the cells; and the pin cost of each pin including a larger number of the pin accessible positions in total is set lower.

17. The circuit design system for a semiconductor integrated circuit according to claim 16, wherein when wiring routes of the pin access to different pins selected from the pins overlap with each other, the pseudo-cell information creation unit assigns the wiring route of the pin access to one of the different pins including a smaller number of the pin accessible positions in total as one of the pin accessible positions, and excludes the wiring route of the pin access to the other pin including a larger number of the pin accessible positions in total from the pin accessible positions.

18. The circuit design system of a semiconductor integrated circuit according to claim 13, wherein after the timing optimization, the pseudo-cell information creation unit modifies the pseudo-cell information inputted in the design database to the cell information that does not reflect the degree of difficulty of pin access.

* * * * *